(12) United States Patent
Leong et al.

(10) Patent No.: US 10,833,594 B2
(45) Date of Patent: Nov. 10, 2020

(54) SYSTEM AND METHOD OF CONTROLLING A POWER CONVERTER HAVING AN LC TANK COUPLED BETWEEN A SWITCHING NETWORK AND A TRANSFORMER WINDING

(71) Applicant: Infineon Technologies Austria AG, Villach (AT)

(72) Inventors: Kennith Kin Leong, Villach (AT); Werner Konrad, Graz (AT); Gerald Deboy, Klagenfurt (AT)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 400 days.

(21) Appl. No.: 15/599,733

(22) Filed: May 19, 2017

(65) Prior Publication Data
US 2018/0337610 A1 Nov. 22, 2018

(51) Int. Cl.
H02M 3/335 (2006.01)
H02M 1/08 (2006.01)
(Continued)

(52) U.S. Cl.
CPC ....... *H02M 3/33592* (2013.01); *H02M 1/083* (2013.01); *H02M 3/33523* (2013.01);
(Continued)

(58) Field of Classification Search
CPC ............. H02M 3/33592; H02M 1/083; H02M 3/33523; H02M 2001/0025; H02M 2001/0058
See application file for complete search history.

(56) References Cited

U.S. PATENT DOCUMENTS 9,231,471 B2  1/2016  Cuk
2008/0291702 A1 11/2008  Hosotani
(Continued)

FOREIGN PATENT DOCUMENTS

CN  104852590 A   8/2015
CN  204858982 U  12/2015
TW  201601426 A   1/2016

OTHER PUBLICATIONS

STMicroelectronics, "An Introduction to LLC Resonant Half-Bridge Converter", AN2644 Application Note, Sep. 15, 2008, 64 pages.
(Continued)

*Primary Examiner* — Jeffrey A Gblende
*Assistant Examiner* — Lakaisha Jackson
(74) *Attorney, Agent, or Firm* — Slater Matsil, LLP

(57) ABSTRACT

A method of operating a converter includes: charging an LC tank coupled between a switching network and a primary winding of a transformer for a first period of time by connecting the LC tank to one or more input capacitors via the switching network, where the switching network includes a first half-bridge coupled between a first supply terminal and a center node, and a second half-bridge coupled between the center node and a second supply terminal; preventing energy transfer from the primary winding of the transformer to a secondary winding of the transformer during the charging of the LC tank; and after charging the LC tank, discharging the LC tank for a second period of time by disconnecting a terminal of the LC tank from the one or more input capacitors.

25 Claims, 23 Drawing Sheets

(51) Int. Cl.
 *H02M 1/00* (2006.01)
 *H02M 1/44* (2007.01)
(52) U.S. Cl.
 CPC ...... *H02M 1/44* (2013.01); *H02M 2001/0025* (2013.01); *H02M 2001/0058* (2013.01)

(56) References Cited

U.S. PATENT DOCUMENTS

| | | | |
|---|---|---|---|
| 2009/0244934 A1* | 10/2009 | Wang | H02M 3/33592 363/21.06 |
| 2010/0231178 A1* | 9/2010 | Handa | H02J 7/0068 320/163 |
| 2012/0281435 A1 | 11/2012 | Schlenk et al. | |
| 2013/0154531 A1 | 6/2013 | Furutani et al. | |
| 2014/0098574 A1* | 4/2014 | Hara | H02M 3/33592 363/21.02 |
| 2017/0063251 A1* | 3/2017 | Ye | H02M 3/33576 |
| 2017/0085183 A1 | 3/2017 | Notsch | |
| 2018/0309372 A1* | 10/2018 | Leong | H02M 1/08 |

OTHER PUBLICATIONS

Ganesh, P. et al., "An Extensive Input Voltage and Fixed-Frequency Single State Series-Parallel LLC Resonant Converter for Dc Drive", International Journal of Modern Engineering Research (IJMER), vol. 2, Sep.-Oct. 2012, ISSN: 2249-645, pp. 3693-3698.

Cheng, K.W.E., "Tapped Inductor for Switched-Mode Power Converters," 2006 2nd International Conference on Power Electronics Systems and Applications, Nov. 12-14, 2006, pp. 14-20.

Hwu, K.I., et al., "Ultrahigh Step-Down Converter," IEEE Transactions on Power Electronics, vol. 30, No. 6, Jun. 2015, pp. 3262-3274.

Inam, W., et al., "Variable Frequency Multiplier Technique for High Efficiency Conversion Over a Wide Operating Range,"IEEE Journal of Emerging and Selected Topics in Power Electronics, vol. 4, Issue 2, Jun. 2016, pp. 335-343.

Sun, X. et al., "Dual-Bridge LLC Resonant Converter With Fixed-Frequency PWM Control for Wide Input Applications", IEEE Transactions on Power Electronics, vol. 32, No. 1, Jan. 2017, pp, 69-80.

\* cited by examiner

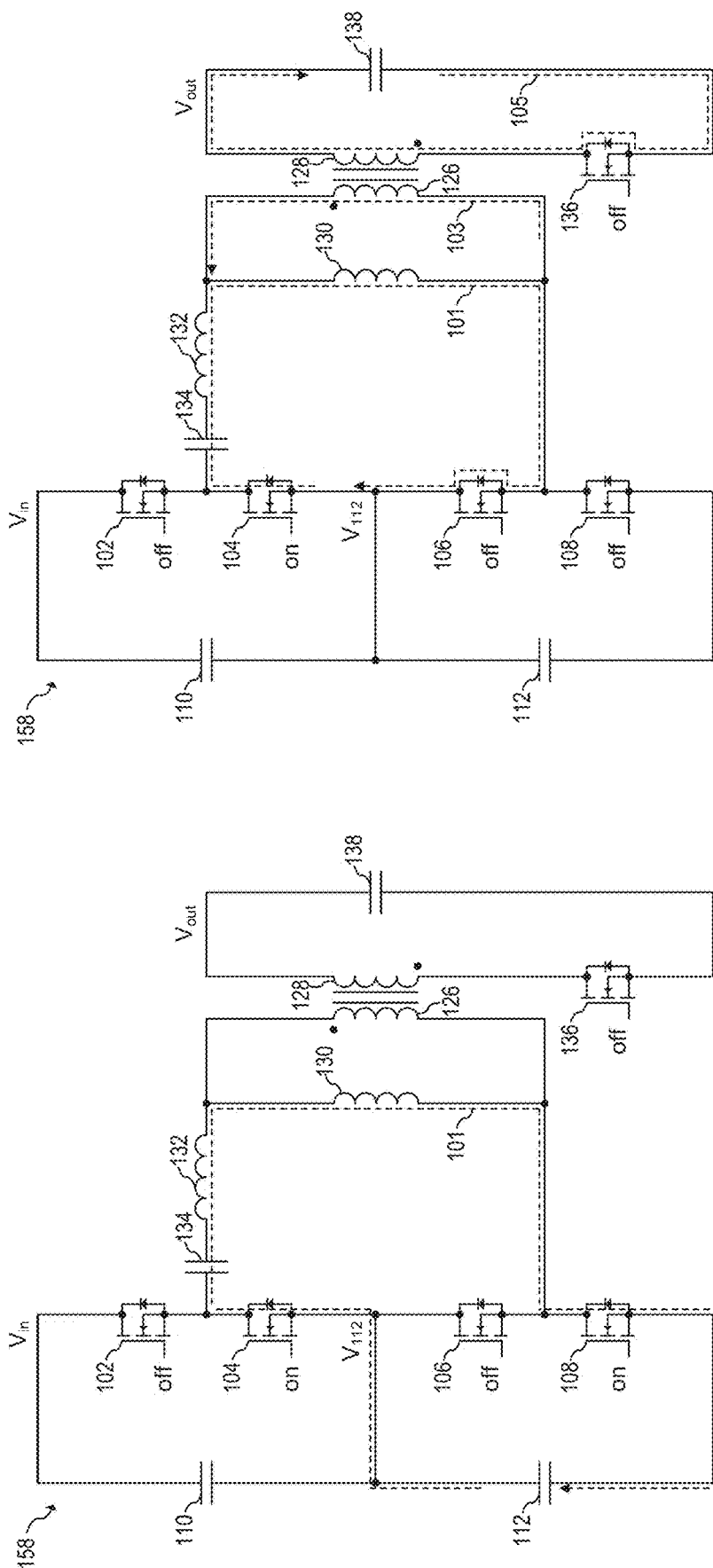

SYSTEM AND METHOD OF CONTROLLING A POWER CONVERTER HAVING AN LC TANK COUPLED BETWEEN A SWITCHING NETWORK AND A TRANSFORMER WINDING

TECHNICAL FIELD

The present invention relates generally to an electronic device, and more particularly to a PWM controlled resonant converter (PCRC).

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. A power supply, therefore, may be referred to as a converter. One class of such systems includes switch-mode power supply (SMPS). The SMPS system offers advantageous power conversion efficiency and increased design flexibility over linear regulators. One type of SMPS is a flyback converter that uses a transformer to provide DC isolation between the input and the output of the converter, and is thus widely used for converting AC line voltages to regulated DC voltages. In a typical flyback converter, energy is stored in the primary side of the transformer when a switch in series with the primary side of the transformer is closed. When the switch is opened, the energy is transferred to the secondary side in order to deliver current to the load.

A particular type of power supply that is widely used is the AC adapter. AC adapters are external AC/DC power supplies typically used in electrical devices that lack the internal ability of deriving power from a standard AC power source. AC adapters may receive their power from an AC power source. The two most common types of AC power sources (also referred to as mains power) are the 120 $V_{rms}$, 60 Hz power source, also known as low-line voltage source, low-line AC voltage, or low-line voltage, and the 230 $V_{rms}$, 50 Hz power source, also known as high-line voltage source, high-line AC voltage, or high line voltage. The root-mean-square (RMS) voltage may not be exactly 120 $V_{rms}$ and 230 $V_{rms}$ for low-line and high-line, respectively. For example, the mains voltage of a low-line input may vary between 85 $V_{rms}$ and 140 $V_{rms}$. Similarly, the mains voltage of a high-line input may vary between 200 $V_{rms}$ and 270 $V_{rms}$.

Universal adapters are AC adapters that are configured to operate with either low-line voltage or high-line voltage. Some universal adapters automatically adjust to the type input power received. Other universal adapters may allow for manual selection of the mode of operation.

SUMMARY

In accordance with an embodiment, a method of operating a converter includes: charging an LC tank coupled between a switching network and a primary winding of a transformer for a first period of time by connecting the LC tank to one or more input capacitors via the switching network, where the switching network includes a first half-bridge coupled between a first supply terminal and a center node, and a second half-bridge coupled between the center node and a second supply terminal; preventing energy transfer from the primary winding of the transformer to a secondary winding of the transformer during the charging of the LC tank; and after charging the LC tank, discharging the LC tank for a second period of time by disconnecting a terminal of the LC tank from the one or more input capacitors.

BRIEF DESCRIPTION OF THE DRAWINGS

For a more complete understanding of the present invention, and the advantages thereof, reference is now made to the following descriptions taken in conjunction with the accompanying drawings, in which:

FIGS. 10-21 illustrate how a converter switches in high-line voltage mode during normal operation, according to an embodiment of the present invention;

Figure 1:
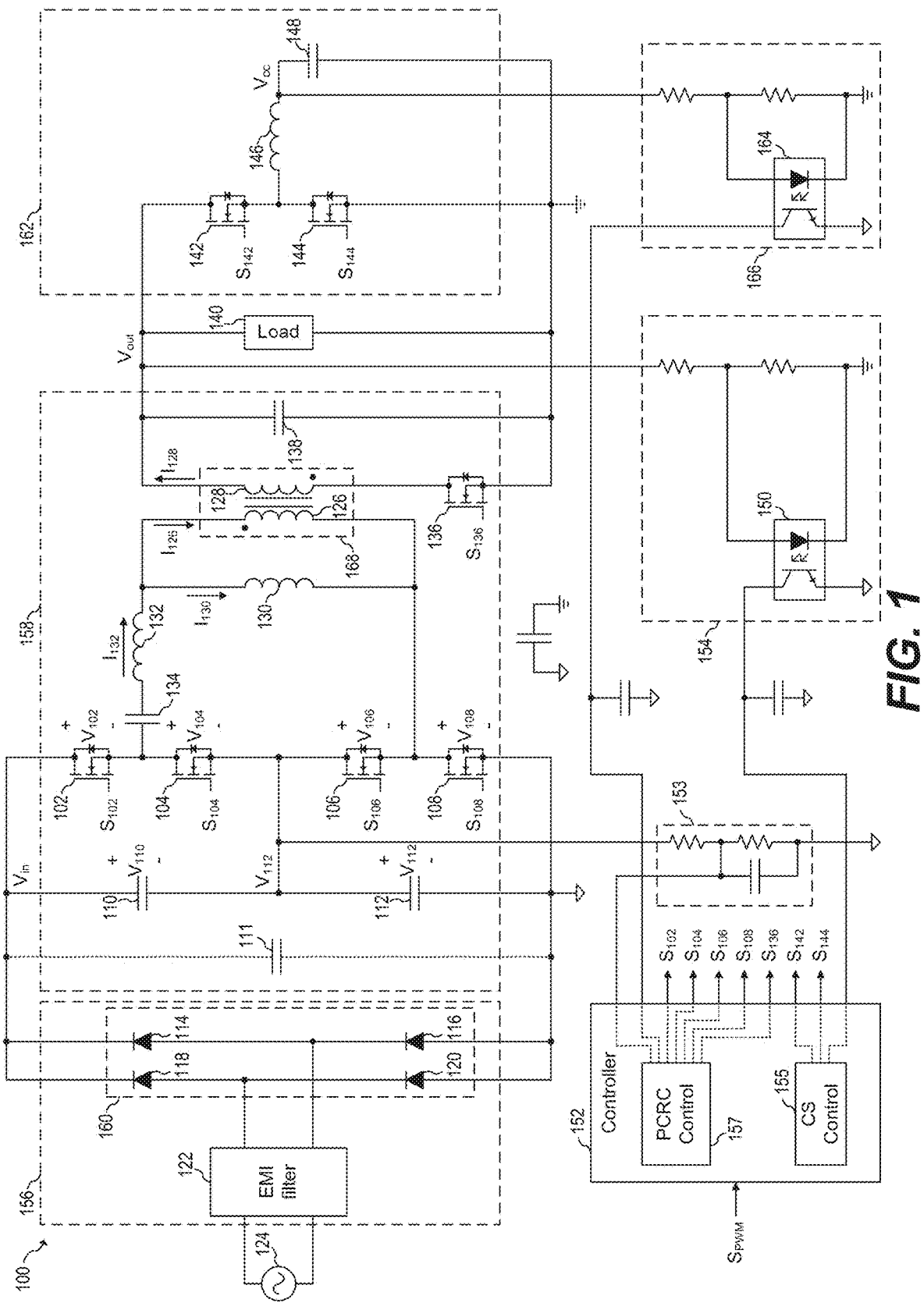
FIG. 1 shows a converter according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a PCRC with or without compensation stage and with zero-voltage switching (ZVS) in various topologies. Embodiments of the present invention may be used with alternative implementations, such as by using alternative switch technologies, as well as with other power converter topologies, such as other compensation stage implementations.

In an embodiment of the present invention, a converter having a PWM controlled stage and a compensation stage coupled to the output of the PWM controlled stage is used to convert rectified AC power into DC power. The PWM controlled stage includes a transformer and an LC tank used to store and transfer energy in a resonant way from a primary side of the transformer to the secondary side of the transformer. The magnetizing inductance of the transformer is used to switch transistors of the PWM controlled stage with ZVS or quasi-ZVS (QZVS). The compensation stage is a bidirectional converter used to regulate an output voltage of the converter. The compensation stage, therefore, allows PWM controlled stage to operate with wide input voltage range.

SMPS systems typically control a current flowing through an inductive element by switching transistors on and off. The on-resistance of such transistors, therefore, may impact the efficiency of the SMPS system. One way to reduce the on-resistance of a transistor is to increase the transistor's die size to reduce on-resistance. A larger transistor die, however, is typically more expensive than a smaller transistor die. The voltage rating of a transistor may also affect the on-resistance. Transistors with higher voltage ratings tend to have higher on-resistance, and may also be physically larger and more expensive. Some SMPS systems, therefore, are designed to use transistors with a lower voltage rating to benefit from the lower on-resistance, smaller physical size and lower cost.

SMPS systems typically include multiple transistors that operate at high frequencies, such as 100 kHz or higher. In other words, transistors in SMPS systems turn on and off at high frequencies during normal operation. When a transistor is off, a voltage across the load path of the transistor may develop. When a transistor turns on while the voltage across the load path of the transistor is greater than zero volts, the parasitic drain capacitance of the transistor may discharge through the load path of the transistor, thereby dissipating power. Such power loss may be significant, especially at high frequencies and high voltages and when multiple transistors are used in parallel. A way to improve power efficiency, therefore, is by having zero volts or a low voltage across a load path of a transistor when turning the transistor on. Setting up a low voltage or zero voltage condition when a switching is being turned on is sometimes referred to as "zero-voltage switching" or ZVS.

In an embodiment of the present invention, a PCRC stage includes an LC tank coupled between a first half-bridge and a second half-bridge. The first half-bridge and the second half-bridge switch such that the LC tank is charged during a charging phase and is discharged in a resonant way during a resonant discharge phase. The LC tank allows for transistors of the first half-bridge and the second half-bridge to turn on with ZVS. The PCRC stage is configured to receive low-line voltage or high-line voltage. When the PCRC receives low-line voltage, the LC tank receives its energy simultaneously from a first and second input capacitor. When the PCRC receives high-line voltage, the LC tank receives its energy from either the first input capacitor or the second input capacitor. A compensation stage having a storage capacitor regulates an output voltage by transferring energy from an output capacitor into the storage capacitor when the output voltage is higher than a predetermined value, and by transferring energy from the storage capacitor into the output capacitor when the output voltage is lower than the predetermined value.

FIG. 1 shows converter 100, according to an embodiment of the present invention. Converter 100 includes AC power source 124, front-end circuit 156, PCRC stage 158, compensation stage (CS) 162, load 140, feedback circuits 166, 154 and 153, and controller 152. Front-end circuit 156 includes EMI filter 122 and rectifier circuit 160. PCRC stage 158 includes input capacitors 110 and 112, transistors 102, 104, 106, 108 and 136, resonant capacitor 134, resonant inductors 130 and 132 (resonant inductor 130 may also be referred to as a magnetizing inductance), transformer 168, and output capacitor 138. CS 162 includes transistors 142 and 144, inductor 146, and storage capacitor 148. Controller 152 includes PCRC control block 157 and CS control block 155. Transformer 168 includes primary winding 126 and secondary winding 128.

During normal operation, the AC power provided by AC power source 124 is rectified by rectifier circuit 160 before reaching input Via. EMI filter 122 filters noise from the converter to AC power source 124. In various embodiments, AC power source 124 represents, for example, an AC voltage generator such as a power inverter, or a power grid that provides an AC line voltage. PCRC stage 158 receives the voltage at input $V_{in}$ and produces a current that flows through primary winding 128. The current flowing through primary winding 126 may produce a corresponding current that flows through secondary winding 126. The current flowing through secondary winding 128 may be rectified by transistor 136, thereby producing a voltage at output $V_{out}$ that is greater than zero volts.

Compensation stage 162 may regulate the voltage at output $V_{out}$. For example, compensation stage 162 may use storage capacitor 148 and inductor 146 to boost the voltage at output $V_{out}$ when the voltage at output $V_{out}$ is below a first predetermined value, and to remove charge from output capacitor 138 into storage capacitor 148 when the voltage at output $V_{out}$ is higher than a second predetermined value. The first predetermined value may be equal to the second predetermined value. Alternatively, the first predetermined value may be lower than the second predetermined value.

PCRC stage 158 may use a resonant discharge to transfer power from the primary side of transformer 168 to the secondary side of transformer 168. Specifically, PCRC stage 158 has two main operating phases: a charging phase and a resonant discharge phase. During the charging phase, current flows from input $V_{in}$ through resonant capacitor 134, and resonant inductors 132 and 130 towards ground. During the charging phase, no current may flow through primary winding 126 since transistor 136 is off and the body diode of transistor 136 is reversed biased. During the resonant discharge phase, transistors 102 and 108 are off and transistors 104 and 106 are on, allowing current to recirculate. During the resonant discharge phase, the voltage across primary winding 126 may flip polarity, allowing current to flow through primary winding 126, which may induce a corresponding current to flow through secondary winding 128.

PCRC stage 158 may be configured to received low-line voltage or high-line voltage and to transfer energy to the secondary side of transformer 168. PCRC stage 158 may have two modes of operation: a low-line voltage mode and a high-line voltage mode. In the low-line voltage mode, transistors 102 and 108 are on during the charging phase. In other words, during the charging phase the current flows from input $V_{in}$, through transistor 102, resonant capacitor 134, resonant inductor 132 and 130, and transistor 108 towards ground. In the high-line voltage mode, power may be taken from either input capacitor 110 or 112 during the charging phase. In other words, during the charging phase, when power is taken from input capacitor 110, transistors 102 and 106 are on and current flows from input $V_{in}$, through transistor 102, resonant capacitor 134, resonant inductor 132 and 130, and transistor 106 towards node $V_{112}$. When power is taken from input capacitor 112, transistors 104 and 108 are on and current flows from input $V_{112}$, through transistor 104, resonant capacitor 134, resonant inductor 132 and 130, and transistor 108 towards ground. The duration of the charging phase determines the peak current flowing through primary winding 168 and ultimately determines the amount of energy transferred to the secondary side of transformer 168. The duration of the charging phase may be controlled, for example, by controlling a duty cycle or frequency of a switching signal provided to the converter. In one embodiment, the duration of the charging phase may be controlled using a pulse width modulator to produce a pulse width modulated (PWM) switching signal.

When input capacitors 110 and 112 have the same capacitance, the voltage at node $V_{112}$ may be one half of input voltage $V_{in}$. When input capacitor 110 does not have the same capacitance than input capacitor 112, however, the voltage at node $V_{112}$ may be different from one half of input of the voltage at input $V_{in}$. Other factors, such as the ESR of the capacitors may affect the voltage at node $V_{112}$. In practice, it may be difficult to have identical capacitors with identical behaviors across all operating conditions. Thus, a control loop may be used to compensate for any shift that the voltage at node $V_{112}$ may have from one half of the voltage at input $V_{in}$.

The voltage at node $V_{112}$ may be monitored by using feedback circuit 153 and controller 152. For example, in high-line mode, controller 152 may sense the voltage at node $V_{112}$ through feedback circuit 153 and determine, based on the voltage at node $V_{112}$, the amount of time converter 100 spends taking power from input capacitor 110 versus the time converter 100 spends taking power from input capacitor 112.

The voltage at output $V_{out}$ may be regulated by using feedback circuit 154 and controller 152. For example, controller 152 may sense the voltage at output $V_{out}$ through feedback circuit 154 and configure compensation stage 162 depending on whether the voltage at output $V_{out}$ is above or below a predetermined target output voltage. Specifically, when the voltage at output $V_{out}$ is below the predetermined target output voltage, compensation stage 162 may operate as a boost converter, taking power from storage capacitor 148 and delivering the power to output capacitor 138. When the voltage at output $V_{out}$ is above the predetermined target output voltage, compensation stage 162 may operate as a buck converter, taking power from output capacitor 138 and delivering the power to storage capacitor 148.

The voltage at node $V_{cc}$ may be regulated by using feedback circuit 166 and controller 152. For example, a target voltage for node $V_{cc}$ may be set below the target voltage for output $V_{out}$. The duration of the charging phase may be adjusted such that node $V_{cc}$ reaches the target voltage for node $V_{cc}$. Since the voltage at output $V_{out}$ is regulated by compensation stage 162, the voltage at node $V_{cc}$ may exhibit ripple without affecting the voltage at output $V_{out}$.

Controller 152 may include circuitry, such as an analog-to-digital converter (ADC) (not shown), to process the signal coming from feedback circuits 153, 154, and 166. Controller 152 may use signal $S_{PWM}$ to determine the desired voltage in output $V_{out}$, by for example, controlling the amount of time of the charging phase. Signal $S_{PWM}$ may be a PWM signal, but may also be any other signal used in the art to convey the desired amplitude. For example, signal $S_{PWM}$ may be a digital communication protocol such as SPI or I²C. In some embodiments, signal $S_{PWM}$ may be an analog signal. Controller 152 may process signal $S_{PWM}$ in any way known in the art. A person skilled in the art may apply the modifications described in this paragraph to other controllers described herein.

Controller 152 is configured to produce signals $S_{102}$, $S_{104}$, $S_{106}$, $S_{108}$, $S_{136}$, $S_{142}$, and $S_{144}$, to drive transistors 102, 104, 106, 108, 136, 142, and 144, respectively. Coupling controller 152 to transistors 102, 104, 106, 108, 136, 142, and 144 may be achieved through direct electrical connection or indirect electrical connections. For example, opto-couplers may be used to electrically isolate the controller from other parts of the circuit. Coupling between controller 152 and other components of converter 100 may also be achieved in other ways known in the art. A person skilled in the art may apply the modifications described in this paragraph to other controllers described herein.

Controller 152 may be implemented as a single chip. Alternatively, controller 152 may be implemented as a collection of controllers, such as, for example, a controller including PCRC control 157 for controlling transistors 102, 104, 106, 108, and 136, and a controller including CS control for controlling transistors 142 and 144. Other implementations known in the art are also possible. For example, generating signal S for controlling transistor 136 may be derived from the signal for the switches forming the current path during the resonance period on the primary side of transformer 168, such as from signals $S_{104}$ and $S_{106}$. Some embodiments may generate signal $S_{136}$ by sensing the current flowing through the body diode of transistor 136 to determine when to turn transistor 136 on. A person skilled in the art may apply the modifications described in this paragraph to other controllers described herein.

AC Power source 124 is configured to provide power to converter 100. AC power source may provide a high-line voltage of 230 $V_{rms}$ and 50 Hz, or a low-line voltage of 120 $V_{rms}$ and 60 Hz. The low-line power typical voltage range may be between 108 $V_{rms}$ and 132 $V_{rms}$. The high-line typical voltage range may be between 207 $V_{rms}$ and 253 $V_{rms}$. Other voltages and frequencies may be used for low-line voltage and high-line voltage.

EMI filter 122 is configured to suppress certain high frequency content to reduce electro-magnetic interference. EMI filter 122 may be implemented with a choke. EMI filter 122 may be implemented in any way known in the art.

Rectifier circuit 160 is configured to rectify the signal received from power source 124. Rectifier circuit 160 may be implemented with a rectifier bridge including diodes 114, 116, 118, and 120. Alternatively, a synchronous rectifier including transistors may be implemented.

A converter may be designed to have a particular physical size, such as a small physical size. The amount of capacitance and the voltage rating of input capacitors 110 and 112 may determine how physically large the input capacitors are. The physical size of the input capacitors may be substantial, and may be 25% of the total converter physical size, in some cases. Decreasing the physical size of the input capacitors may be accomplished by decreasing the capacitance of the input capacitors. For example, having input capacitors 110 and 112 with a small capacitance, such as 2 uF, may result in a physically smaller converter than a converter with input capacitors 110 and 112 having a capacitance of 100 uF or more. Decreasing the capacitance of input capacitors 110 and 112, however, may result in a voltage at input $V_{in}$, having wide variations. Alternatively, having input capacitors 110 and 112 with a large capacitance, such as 100 uF or more, may result in a physically large converter with the voltage at input $V_{in}$, having a small ripple. A converter with a small physical size and low ripple may be achieved by using input capacitors with a small capacitance to achieve a small physical size, and by using compensation stage 162 to regulate the output voltage to achieve low ripple. Alternatively, when input capacitors with higher capacitance are used, compensation stage 162 may be omitted. Optional input capacitor 111 may be added to allow a more effective energy storage at the full input voltage. In this case the capacitance of input capacitors 110 and 112 can be chosen very small and allow the use of, for example, ceramic capacitors, while capacitance 111 may be, for example, an electrolytic capacitor.

Transistors 102, 104, 106, 108, 136, 142, and 144 may all be NMOS transistors. Alternatively, not all transistors may be of the same type. Other types of transistors may be used. For example, transistors of the n-type and p-type, metal oxide semiconductor field effect transistors (MOSFETs), power MOSFETs, junction field effect transistor (JFETs) high electron mobility transistor (HEMT) such as gallium nitride (GaN) HEMTs and insulated gate bipolar transistors (IGBTs), and others. The selection of transistor type may be made according to the system requirements. Appropriate adjustments to the circuit may be made to accommodate the particular device type, such as, for example, including additional diodes or inverting the control signal polarities.

Transformer 168 may include primary winding 126, and secondary winding 168. Other implementations are possible. For example, transformer 102 may also include an auxiliary winding coupled to other circuit components.

Resonant capacitor 134 and resonant inductors 132 and 130 may be discrete components. Alternatively, inductors 132 and 130 may be incorporated into transformer 168. For example, inductance $L_{132}$ of resonant inductor 132, and inductance $L_{130}$ of resonant inductor 130 may be given by Equations 1 and 2 below, $$L_{132} = L_{126} \cdot (1-k^2) \quad (1)$$

$$L_{130} = L_{126} \cdot k^2 \quad (2)$$

where $L_{126}$ is the effective inductance of primary winding 126 and k is the coupling coefficient of transformer 168, which may be given by Equation 3 below, $$k = \frac{M}{\sqrt{L_{126} \cdot L_{128}}} \quad (3)$$

where $L_{128}$ is the effective inductance of secondary winding 128 and M is the mutual inductance of transformer 168.

Figure 2:
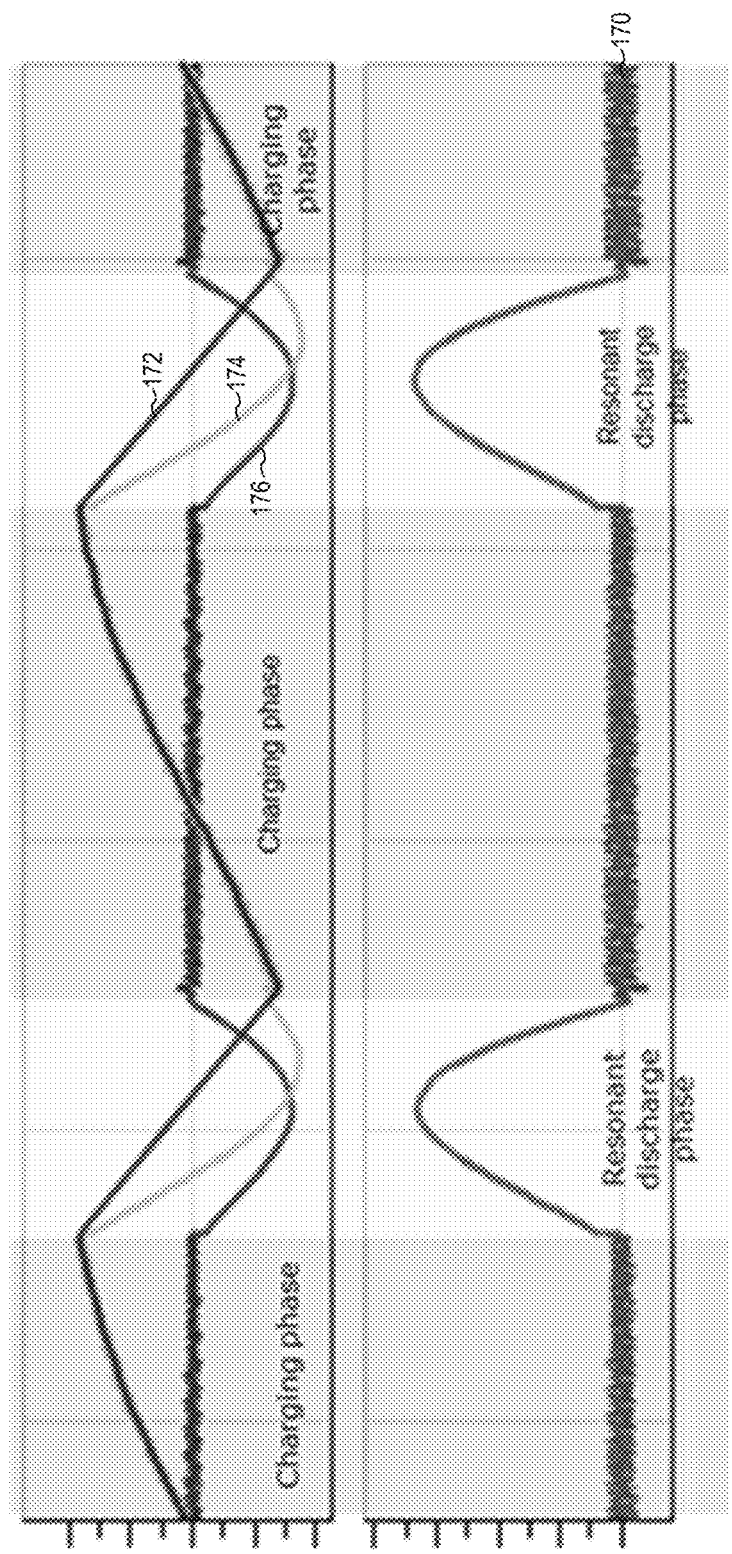
FIG. 2 shows waveforms of current of a converter during the charging phase and the resonant discharge phase, according to an embodiment of the present invention.

FIG. 2 shows waveforms of current of converter 100 during the charging phase and the resonant discharge phase, according to an embodiment of the present invention. FIG. 2 may be understood in view of FIG. 1. FIG. 2 includes curve 172 of current $I_{130}$, curve 174 of current $I_{132}$, curve 176 of current $I_{126}$, and curve 170 of current $I_{128}$.

During the charging phase, current $I_{132}$ increases charging the resonant tank including resonant capacitor 134 and resonant inductor 132. During the charging phase, no energy is transferred to the secondary side of transformer 168 because transistor 136 is off and the body diode of transistor 136 is reversed biased. Consequently, currents $I_{126}$ and $I_{128}$ remain substantially at zero. Since current $I_{126}$ is negligible during the charging phase, current $I_{132}$ is substantially equal to current $I_{130}$.

During the resonant discharge phase, the resonant tank including resonant capacitor 134 and resonant inductor 132 is disconnected from the power source, such as from input $V_{in}$ and ground, and begins to resonate. Current $I_{126}$, therefore, begins flowing in the negative direction, inducing current $I_{128}$ to flow through secondary winding.

The duration of the charging phase determines the amount of energy stored in the resonant tank including resonant capacitor 134 and resonant inductor 132 and, thereby, determines the amount of energy that is transferred to the secondary side of transformer 168. Controlling the duration of the charging phase through, for example, a PWM scheme, therefore, may be used to control an output voltage, such as node $V_{cc}$ or output $V_{out}$.

Figure 3:
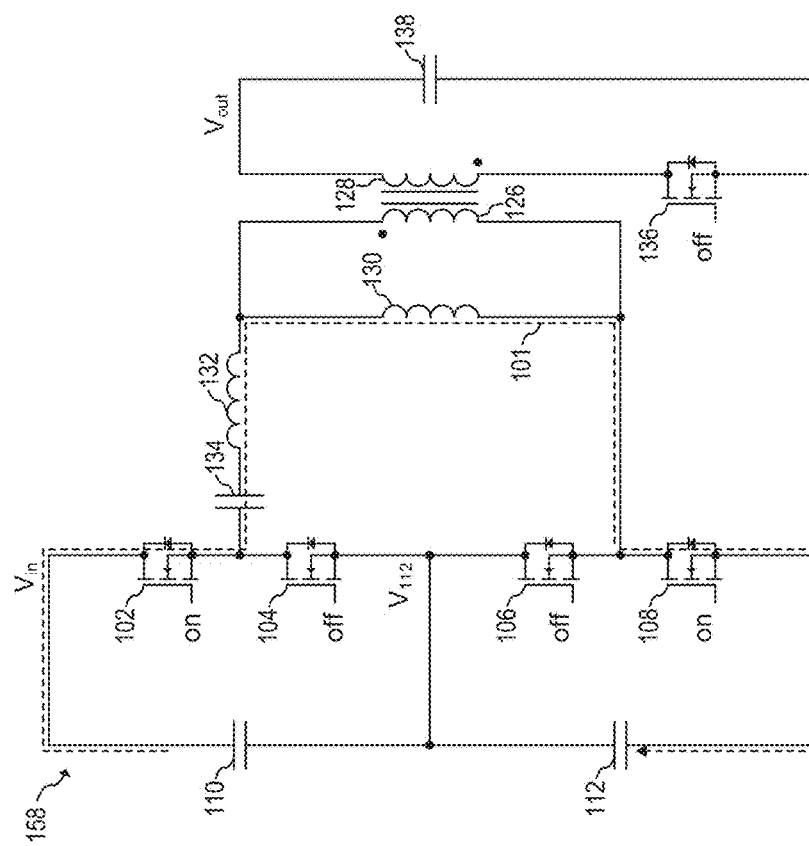

Converter 100 may achieve ZVS by transitioning between the charging phase and the resonant discharge phase through various transitional states during normal operation. FIGS. 3-8 illustrate how converter 100 switches in low-line voltage mode during normal operation, according to an embodiment of the present invention. FIG. 3 shows the state of transistors and current behavior of converter 100 when converter 100 is in the main charging state of the charging phase of the low-line voltage mode, according to an embodiment of the present invention. As shown in FIG. 3, when converter is in the main charging state of the low-line voltage mode, transistors 102 and 108 are on, and transistors 104, 106, and 136 are off. Current 100 flows, therefore, from input $V_{in}$ through the load path of transistor 102, resonant capacitor 134, resonant inductors 132 and 130, and the load path of transistor 108 toward ground. There may be no current flowing through transistor 136 since transistor 136 is off and the body diode of transistor 136 is reversed biased. Consequently, there may not be any current flowing through either secondary winding 128 or primary winding 126.

Figure 4:
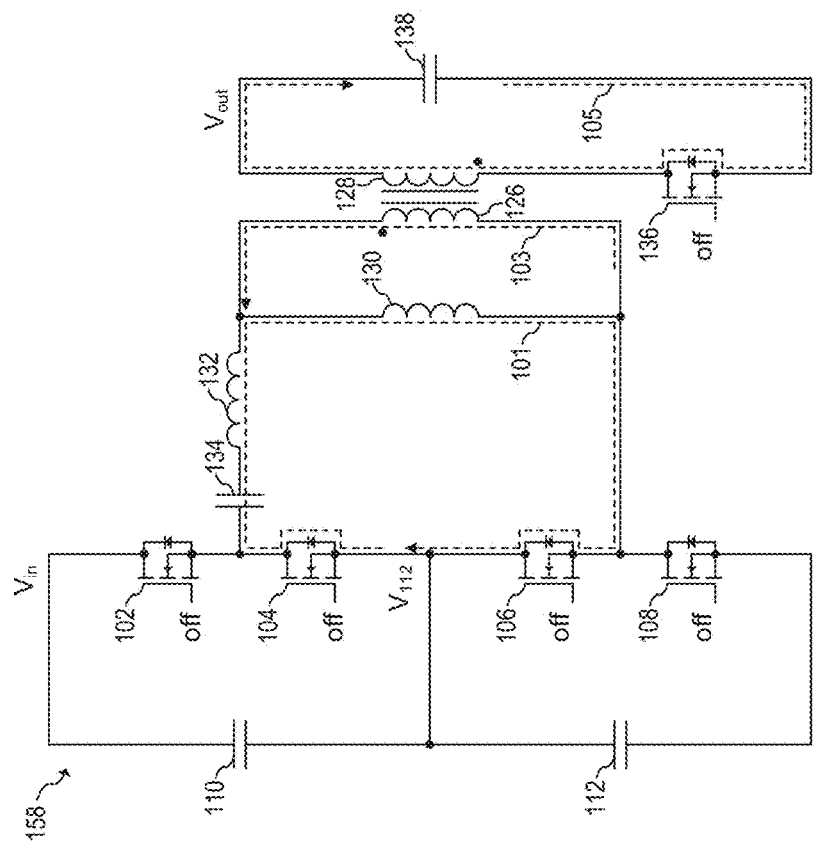
FIGS. 3-8 illustrate how a converter switches in low-line voltage mode during normal operation, according to an embodiment of the present invention.

FIG. 4 shows the state of transistors and current behavior of converter 100 when converter 100 is in a first resonant discharge transitional state of the resonant discharge phase of the low-line voltage mode, according to an embodiment of the present invention. Transistors 102 and 108 are turned off at the beginning of the first resonant discharge transitional state of the low-line voltage mode. Current, therefore, recirculates through the body diodes of transistors 104 and 106. The current flowing through the body diodes of transistors 104 and 106 may discharge the drain capacitances of transistors 104 and 106, causing the voltages across the load path of transistors 104 and 106 to reduce, for example, to zero volts. Current 103 begins flowing through primary winding 126 as a result of the resonant tank including resonant capacitor 134 and resonant inductor 132. Current 103 induces current 105 to flow through secondary winding 128 and through the body diode of transistor 136. The current flowing through the body diodes of transistor 136 may discharge the drain capacitance of transistor 136, causing the voltage across the load path of transistor 136 to reduce, for example, to zero volts.

Figure 5:
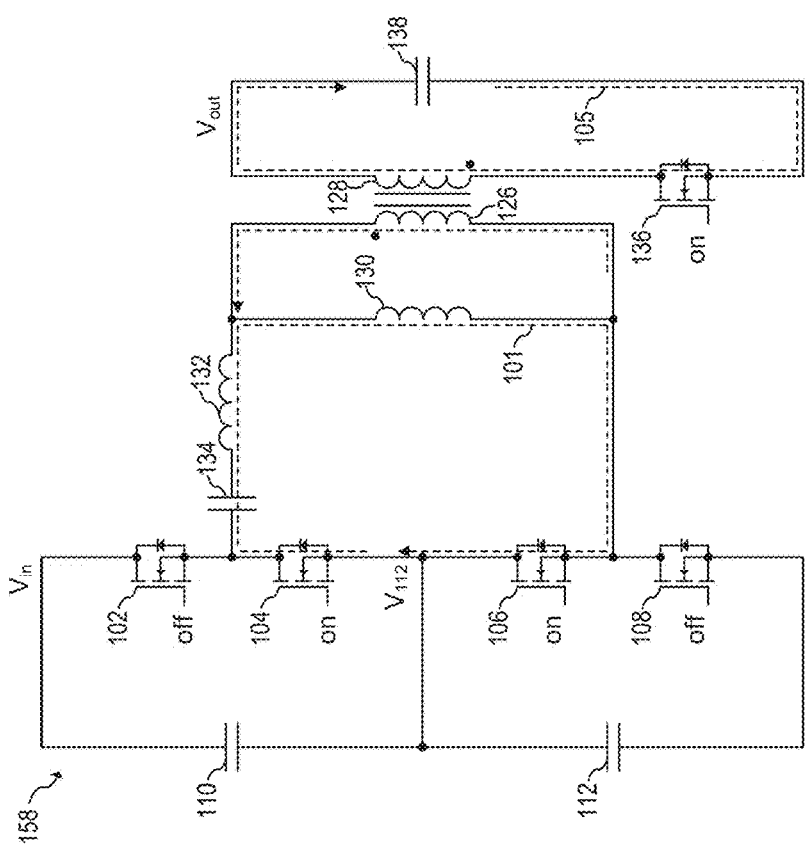

FIG. 5 shows the state of transistors and current behavior of converter 100 when converter 100 is in the main resonant discharge state of the resonant discharge phase of the low-line voltage mode, according to an embodiment of the present invention. Once the voltages across the load path of transistors 104, 106 and 136 are reduced, transistors 104, 106, and 136 may be turned on with ZVS. Transistors 104, 106, and 136 may be turned on simultaneously. Alternatively, transistors 104, 106, and 136 may be turned on at a time when ZVS is achievable. Once transistors 104, 106, and 136 are on, current 101 may flow through the load path of transistors 104 and 106 instead of through the body diode of transistors 104 and 106, and current 105 may flow through the load path of transistor 136 instead of through the body diode of transistors 136.

Figure 6:
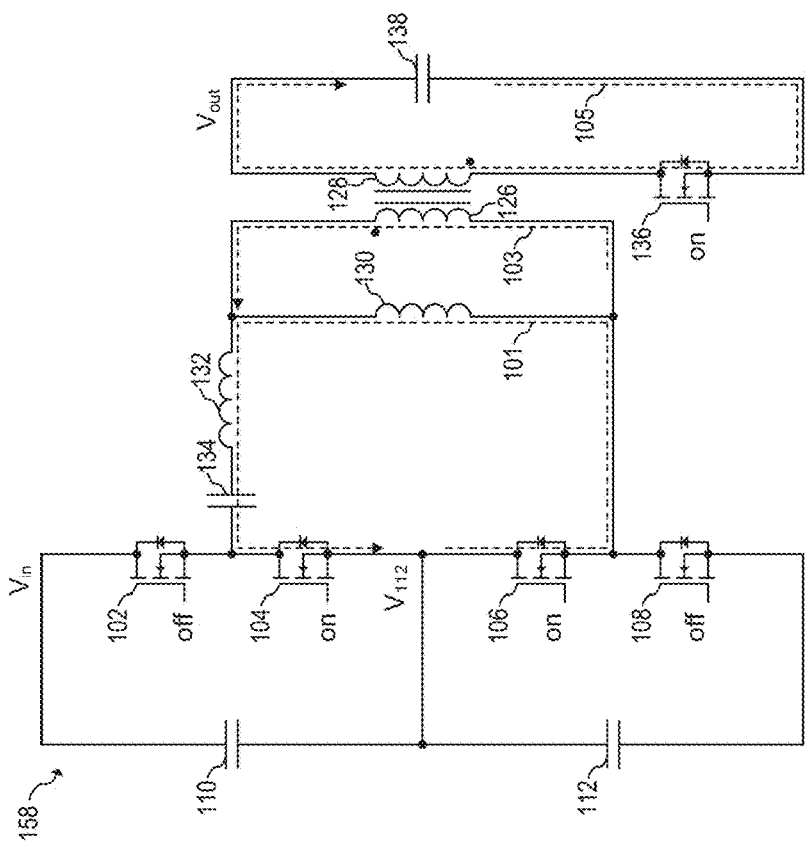

FIG. 6 shows the state of transistors and current behavior of converter 100 when converter 100 is in a second resonant discharge transitional state of the resonant discharge phase of the low-line voltage mode, according to an embodiment of the present invention. As shown in FIG. 6, current 101 flips polarity, in part, as a result of the resonant tank including resonant capacitor 134 and resonant inductor 132. Current 103 may still flow through primary winding 126. Current 103, however, may be decreasing during the second resonant discharge transitional state. Consequently, current 105 may continue to flow through secondary winding 128 and the load path of transistor 136.

Figure 7:
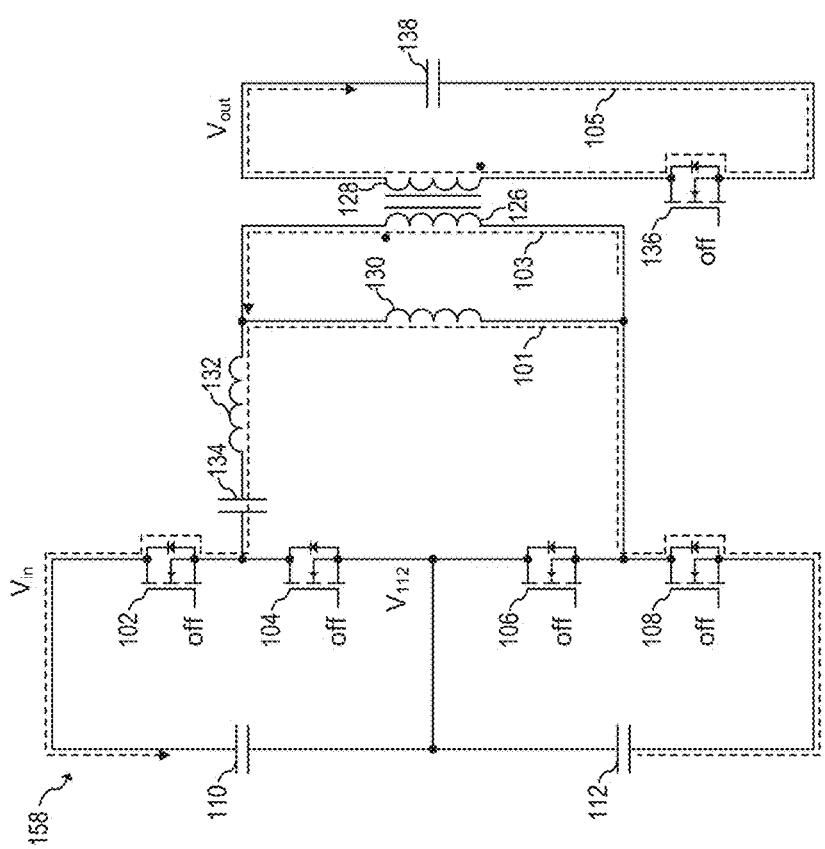

FIG. 7 shows the state of transistors and current behavior of converter 100 when converter 100 is in a third resonant discharge transitional state of the resonant discharge phase of the low-line voltage mode, according to an embodiment of the present invention. Transistors 104 and 106 are turned off at the beginning of the third resonant discharge transitional state of the low-line voltage mode. Current, therefore, circulates through the body diodes of transistors 102 and 108. The current flowing through the body diodes of transistors 102 and 108 may discharge the drain capacitances of transistors 102 and 108, causing the voltage across the load path of transistors 102 and 108 to reduce, for example, to zero volts. Current 103, if any, may flow through primary winding 126. Current 105, if any, may flow through secondary winding 128 and through the body diode of transistor 136.

Figure 8:
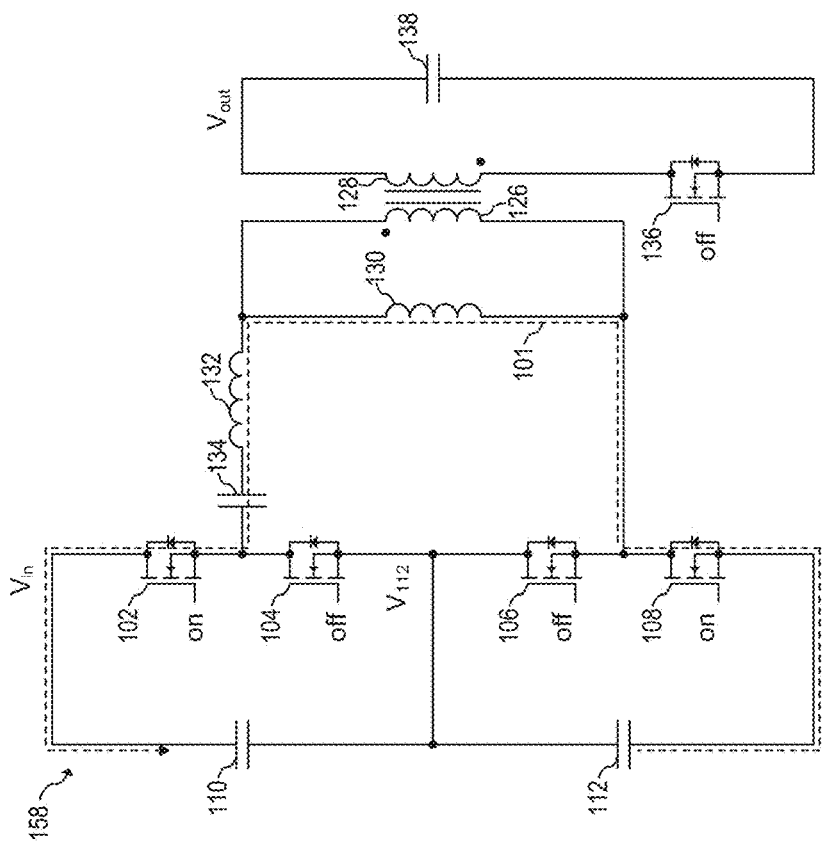

FIG. 8 shows the state of transistors and current behavior of converter 100 when converter 100 is in a first transitional charging state of the charging phase of the low-line voltage mode, according to an embodiment of the present invention. Once the voltages across the load path of transistors 102 and 108 are reduced, transistors 102 and 108 may be turned on with ZVS. Transistors 102 and 108 may be turned on simultaneously. Alternatively, transistors 102 and 108 may be turned on at a time when ZVS is achievable. Once transistors 102 and 108 are on, current 101 may flow through the load path of transistors 102 and 108 instead of through the body diode of transistors 102 and 108 No current may flow through primary winding 126 or secondary winding 128 since transistor 136 is off and the body diode of transistor 136 is reversed biased. The main charging state of the low-line voltage mode follows after the first transitional charging state of the low-line voltage mode, repeating the sequence.

Figure 9:
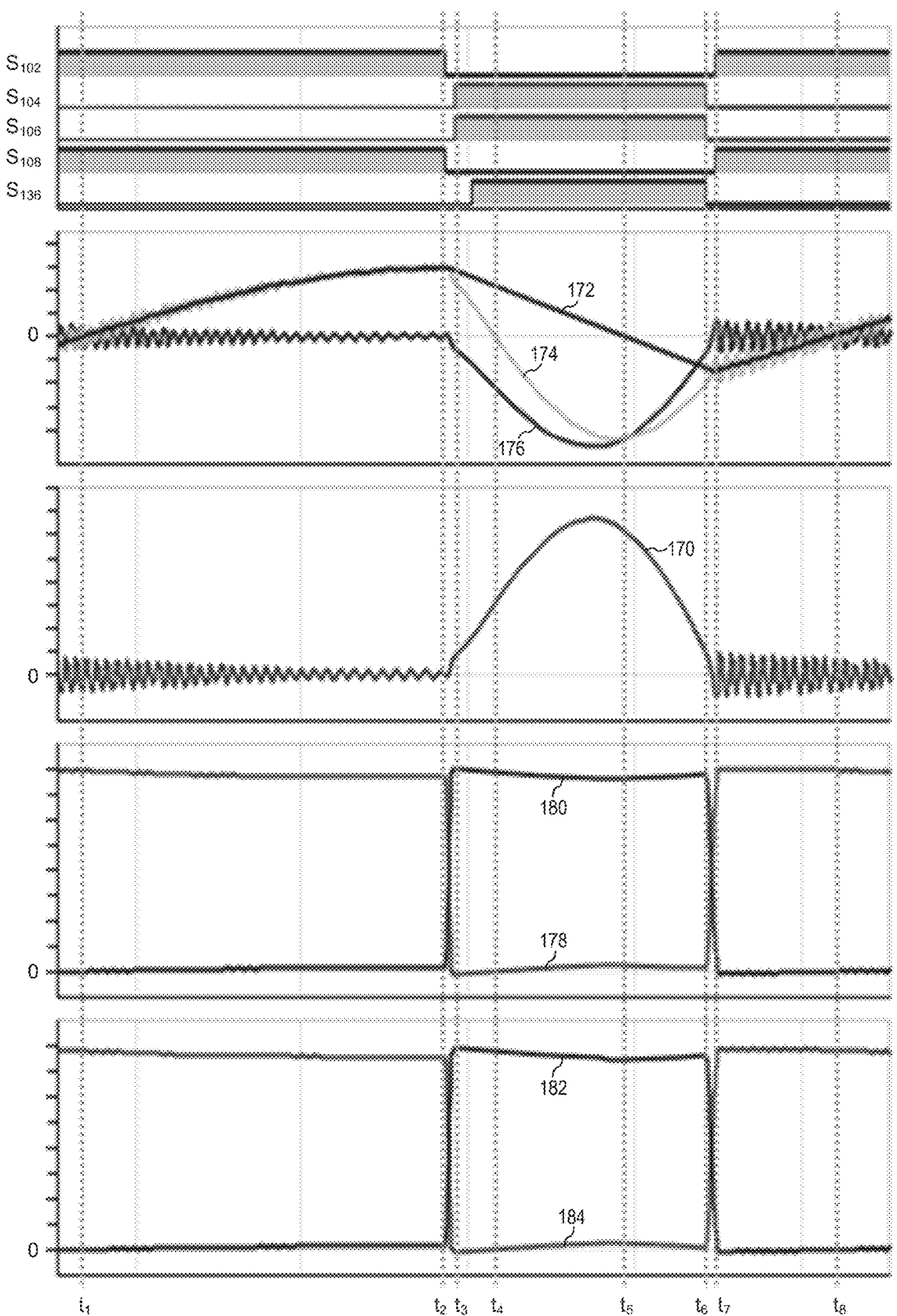
FIG. 9 illustrates waveforms of a converter during normal operation in low-line voltage mode, according to an embodiment of the present invention.

FIG. 9 illustrates waveforms of converter 100 during normal operation in low-line voltage mode, according to an embodiment of the present invention. The waveforms of FIG. 9 may be understood in view of FIGS. 1-8. FIG. 9 includes curve 172 of current $I_{130}$, curve 174 of current $I_{132}$, curve 176 of current $I_{126}$, curve 170 of current $I_{128}$, curve 178 of voltage $V_{104}$, curve 180 of voltage $V_{102}$, curve 182 of voltage $V_{108}$, curve 184 of voltage $V_{106}$, and signals $S_{102}$, $S_{104}$, $S_{106}$, $S_{108}$, and $S_{136}$ of transistors 102, 104, 106, 108, and 136 respectively.

During the time between time $t_1$ and time $t_2$, transistors 102 and 108 are on and currents $I_{130}$ and $I_{132}$ increase while current $I_{126}$ and $I_{128}$ remain substantially at zero, as can be seen from curves 172, 174, 176, and 170. The voltages $V_{102}$ and $V_{108}$ across the load paths of transistors 102 and 108 are substantially zero, as can be seen from curves 180 and 182, respectively. The voltages across the load paths of transistors 104 and 106 are high, as can be seen from curves 178 and 184, respectively. The current flow through converter 100 during the time between time $t_1$ and time $t_2$ is also illustrated by FIG. 3.

At time $t_2$, transistors 102 and 108 are turned off. The current flow through converter 100 during the time between time $t_2$ and time $t_3$ is illustrated by FIG. 4. Current begins flowing through primary winding 126 and secondary winding 128, as shown by curves 176 and 170 respectively. The voltages $V_{104}$ and $V_{106}$ across the load paths of transistors 104 and 106 drop to zero volts, as can be seen from curves 178 and 184, respectively. The voltage across transistor 136 (not shown) may also be zero volts by time $t_3$.

At time $t_3$, transistors 104 and 106 are turned on with ZVS. Transistor 136 may be turned on with ZVS a first time after transistors 104 and 106 are turned on to ensure that transistor 136 is turned on with ZVS. In some embodiments, the duration of the first time may be zero. In other words, transistors 104, 106 and 136 may be turned on simultaneously. The current flow through converter 100 during the time between time $t_3$ and time $t_4$ where transistors 104, 106 and 136 are on is also illustrated by FIG. 5.

At time $t_4$, current $I_{132}$ becomes negative, as can be seen by curve 174. In other words, current $I_{132}$ changes direction at time $t_4$. At time $t_5$, current $I_{130}$ becomes negative, as can be seen by curve 172. The current flow through converter 100 during the time between time $t_5$ and time $t_6$ is also illustrated by FIG. 6.

At time $t_6$, transistors 104, 106, and 136 are turned off. The current flow through converter 100 during the time between time $t_6$ and time $t_7$ is illustrated by FIG. 7. The voltages $V_{102}$ and $V_{108}$ across the load paths of transistors 102 and 108 drop to zero volts, as can be seen from curves 180 and 182, respectively.

At time $t_7$, transistors 102 and 108 are turned on with ZVS. At time $t_7$, currents $I_{130}$ and $I_{132}$ become positive, as can be seen by curves 172 and 174, respectively. The current flow through converter 100 after time $t_7$ is illustrated by FIG. 3, repeating the cycle.

Figure 10:
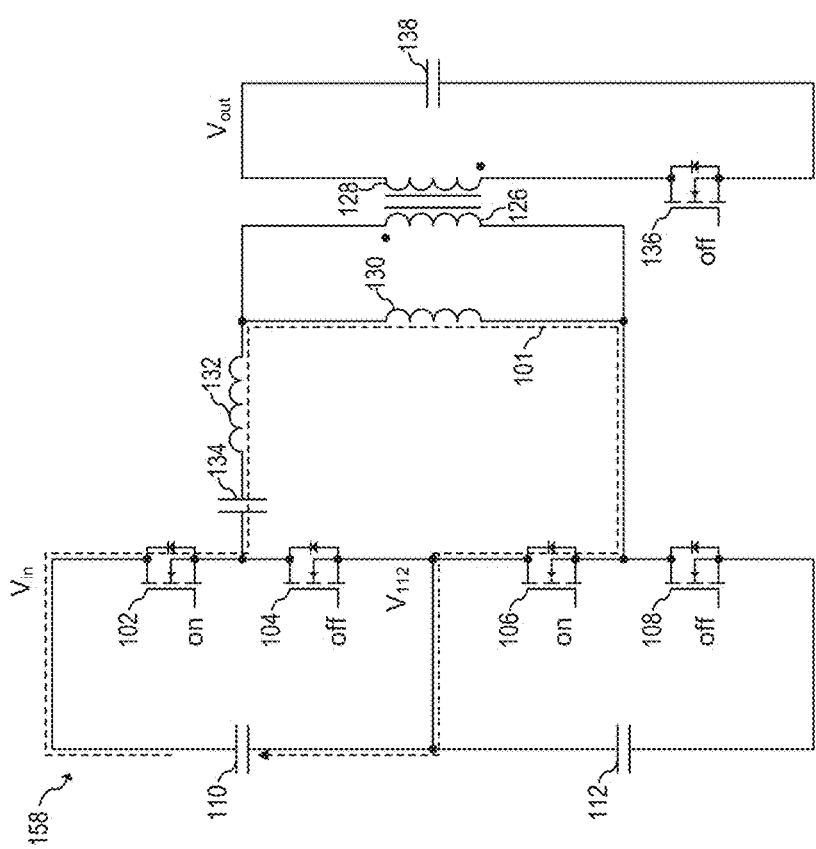

Converter 100 may be configured to receive high-line voltage and continue to achieve ZVS during normal operation. FIGS. 10-21 illustrate how converter 100 switches in high-line voltage mode during normal operation, according to an embodiment of the present invention. FIG. 10 shows the state of transistors and current behavior of converter 100 when converter 100 is in a first main charging state of the charging phase of the high-line voltage mode, according to an embodiment of the present invention. As shown in Figure to, when converter is in the first main charging state of the high-line voltage mode, transistors 102 and 106 are on, and transistors 104, 108, and 136 are off. Current 101 flows, therefore, from input $V_{in}$, through the load path of transistor 102, resonant capacitor 134, resonant inductors 132 and 130, and the load path of transistor 106 toward node $V_{112}$. There may be no current flowing through transistor 136 since transistor 136 is off and the body diode of transistor 136 is reversed biased. Consequently, there may not be any current flowing through either secondary winding 128 or primary winding 126.

Figure 11:
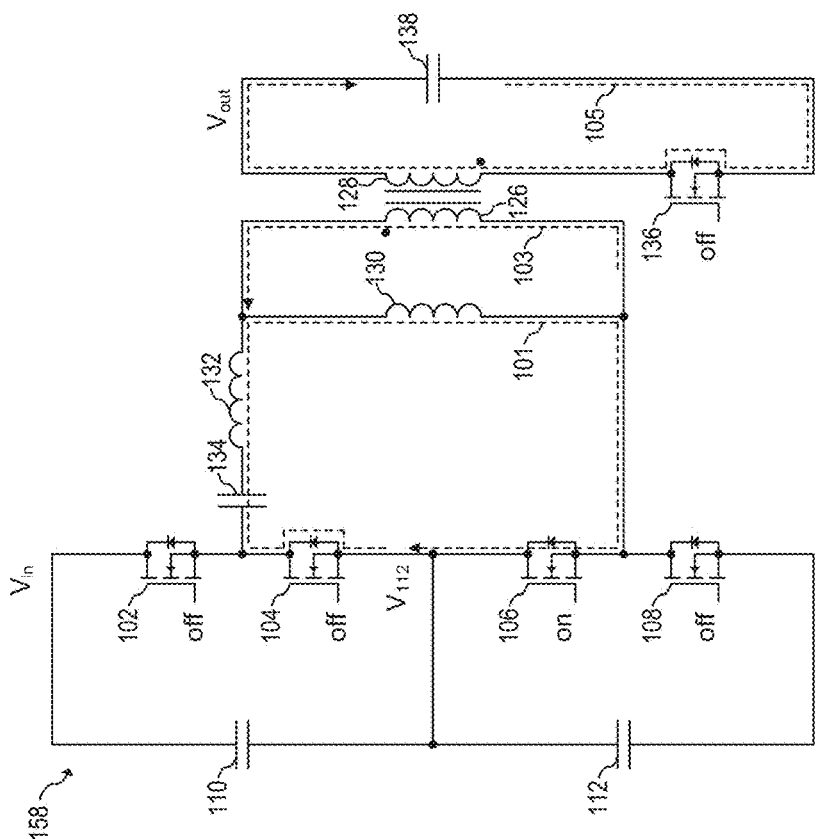

FIG. 11 shows the state of transistors and current behavior of converter 100 when converter 100 is in a first resonant discharge transitional state of the resonant discharge phase of the high-line voltage mode, according to an embodiment of the present invention. Transistor 102 is turned off at the beginning of the first resonant discharge transitional state of the high-line voltage mode. Current, therefore, recirculates through the body diodes of transistor 104 and the load path of transistor 106. The current flowing through the body diodes of transistor 104 may discharge the drain capacitances of transistor 104, causing the voltage across the load path of transistor 104 to reduce, for example, to zero volts. Current 103 begins flowing through primary winding 126 as a result of the resonant tank including resonant capacitor 134 and resonant inductor 132 Current 103 induces current 105 to flow through secondary winding 128 and through the body diode of transistor 136. The current flowing through the body diodes of transistor 136 may discharge the drain capacitance of transistor 136, causing the voltage across the load path of transistor 136 to reduce, for example, to zero volts.

Figure 12:
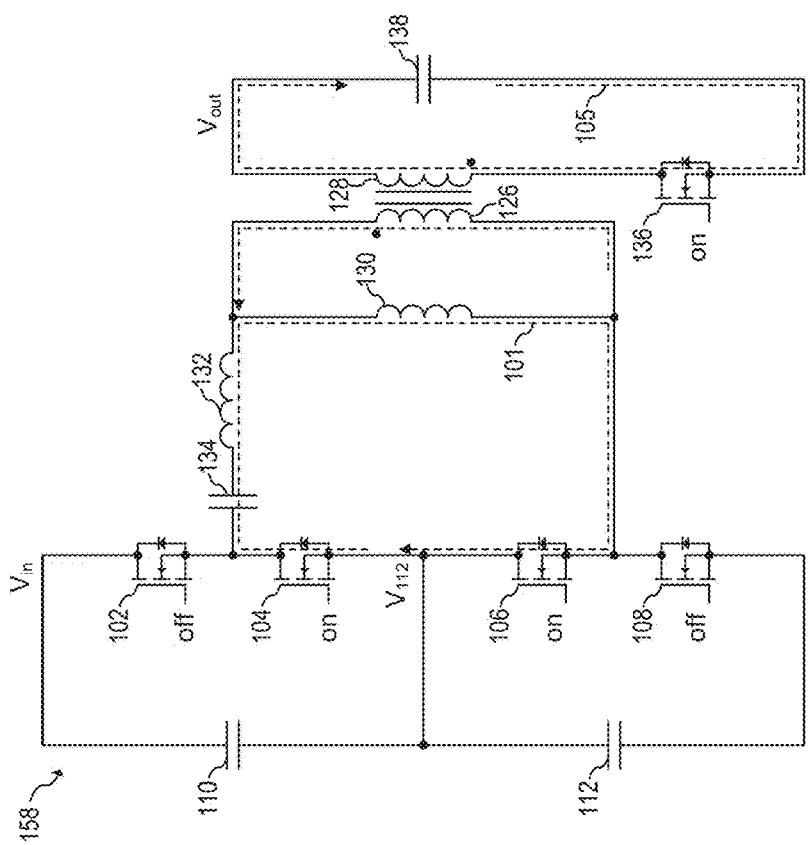

FIG. 12 shows the state of transistors and current behavior of converter 100 when converter 100 is in the first main resonant discharge state of the resonant discharge phase of the high-line voltage mode, according to an embodiment of the present invention. Once the voltages across the load path of transistors 104 and 136 are reduced, transistors 104 and 136 may be turned on with ZVS. Transistors 104 and 136 may be turned on simultaneously. Alternatively, transistors 104 and 136 may be turned on at a time when ZVS is achievable. Once transistors 104, 106, and 136 are on, current 101 may flow through the load path of transistors 104, and current 105 may flow through the load path of transistor 136.

Figure 13:
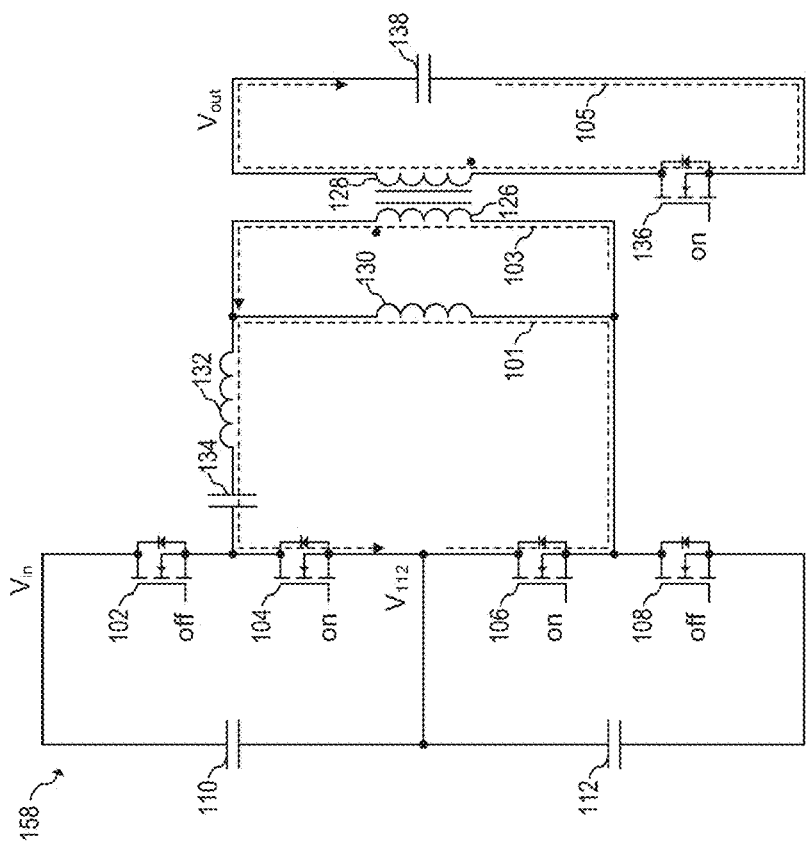

FIG. 13 shows the state of transistors and current behavior of converter 100 when converter 100 is in a second resonant discharge transitional state of the resonant discharge phase of the high-line voltage mode, according to an embodiment of the present invention. As shown in FIG. 13 current 101 flips polarity, in part, as a result of the resonant tank including resonant capacitor 134 and resonant inductor 132. Current 103 may still flow through primary winding 126. Current 103, however, may be decreasing during the second resonant discharge transitional state. Consequently, current 105 may continue to flow through secondary winding 128 and the load path of transistor 136.

Figure 14:
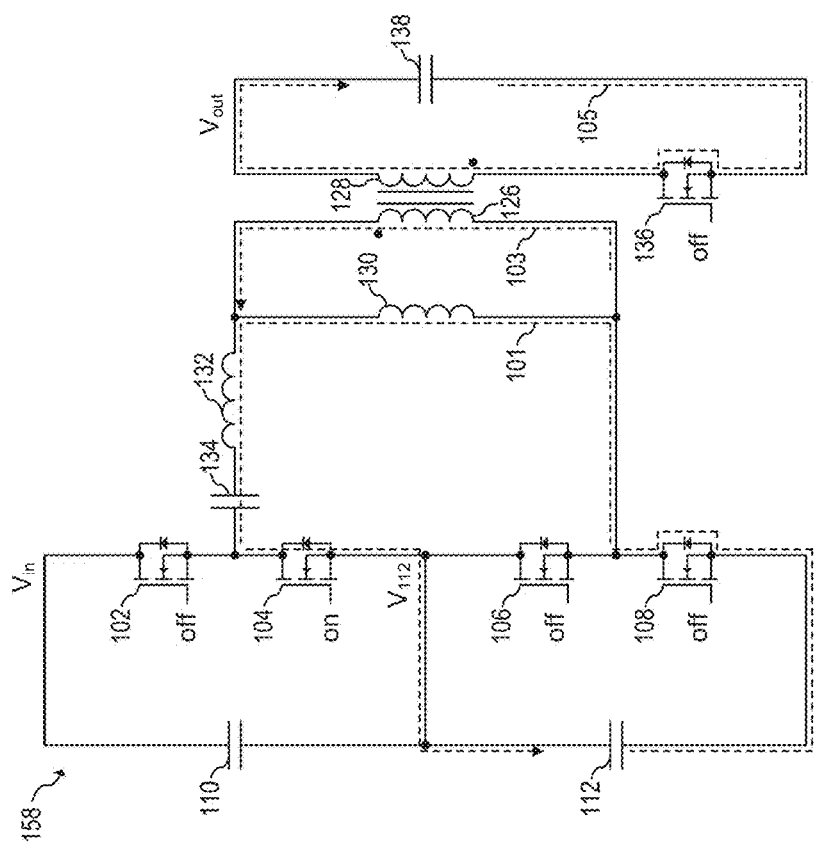

FIG. 14 shows the state of transistors and current behavior of converter 100 when converter 100 is in a third resonant discharge transitional state of the resonant discharge phase of the high-line voltage mode, according to an embodiment of the present invention Transistor 106 is turned off at the beginning of the third resonant discharge transitional state of the high-line voltage mode. Current, therefore, circulates through the body diodes of transistor 108 and through the load path of transistor 104. The current flowing through the body diodes of transistor 108 may discharge the drain capacitances of transistor 108, causing the voltage across the load path of transistor 108 to reduce, for example, to zero volts. Current 103, if any, may flow through primary winding 126. Current 105, if any, may flow through secondary winding 128 and through the body diode of transistor 136.

Figure 15:
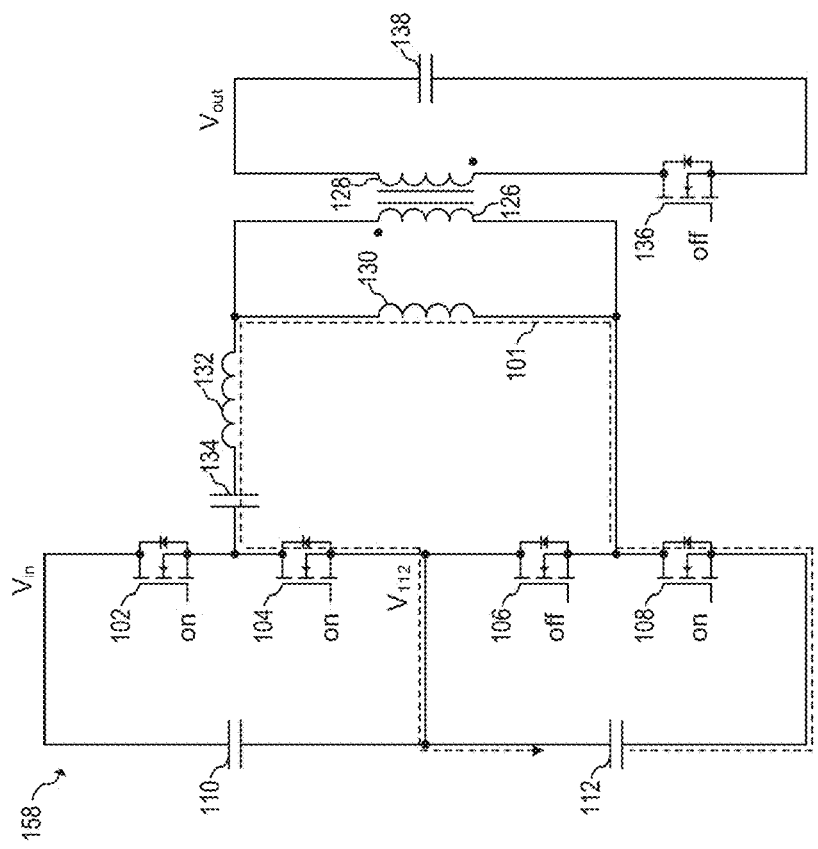

FIG. 15 shows the state of transistors and current behavior of converter 100 when converter 100 is in a first transitional charging state of the charging phase of the high-line voltage mode, according to an embodiment of the present invention. Once the voltage across the load path of transistor 108 is reduced, transistor 108 may be turned on with ZVS. Once transistors 104 and 108 are on, current 101 may flow through the load path of transistors 104 and 108. No current may flow through primary winding 126 or secondary winding 128 since transistor 136 is off and the body diode of transistor 136 is reversed biased.

FIG. 16 shows the state of transistors and current behavior of converter 100 when converter 100 is in a second main charging state of the charging phase of the high-line voltage mode, according to an embodiment of the present invention. As shown in FIG. 16, when converter is in the second main charging state of the high-line voltage mode, transistors 104 and 108 are on, and transistors 102, 106, and 136 are off. Current 101 flows, therefore, from input $V_{112}$ through the load path of transistor 104, resonant capacitor 134, resonant inductors 132 and 130, and the load path of transistor 108 toward ground. There may be no current flowing through transistor 136 since transistor 136 is off and the body diode of transistor 136 is reversed biased. Consequently, there may not be any current flowing through either secondary winding 128 or primary winding 126.

FIG. 17 shows the state of transistors and current behavior of converter 100 when converter 100 is in a fourth resonant discharge transitional state of the resonant discharge phase of the high-line voltage mode, according to an embodiment of the present invention. Transistor 108 is turned off at the beginning of the fourth resonant discharge transitional state of the high-line voltage mode. Current, therefore, recirculates through the body diodes of transistor 106 and the load path of transistor 104. The current flowing through the body diodes of transistor 106 may discharge the drain capacitances of transistor 106, causing the voltage across the load path of transistor 106 to reduce, for example, to zero volts. Current 103 begins flowing through primary winding 126 as a result of the resonant tank including resonant capacitor 134 and resonant inductor 132. Current 103 induces current 105 to flow through secondary winding 128 and through the body diode of transistor 136. The current flowing through the body diodes of transistor 136 may discharge the drain capacitance of transistor 136, causing the voltage across the load path of transistor 136 to reduce, for example, to zero volts.

Figure 18:
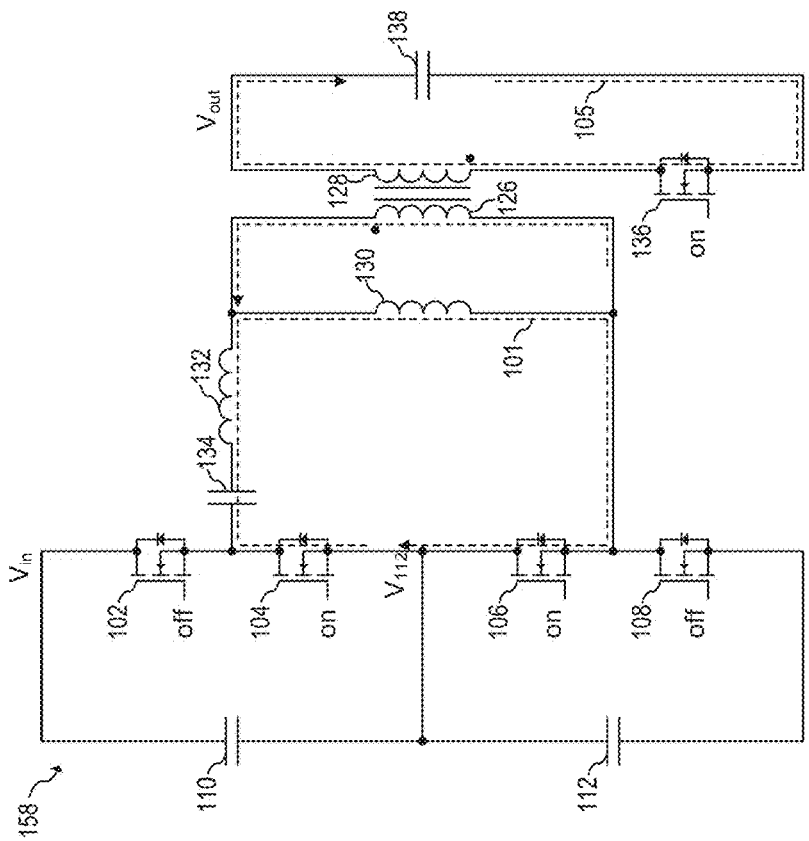

FIG. 18 shows the state of transistors and current behavior of converter 100 when converter 100 is in the second main resonant discharge state of the resonant discharge phase of the high-line voltage mode, according to an embodiment of the present invention. Once the voltages across the load path of transistors 106 and 136 are reduced, transistors 106 and 136 may be turned on with ZVS. Transistors 106 and 136 may be turned on simultaneously. Alternatively, transistors 106 and 136 may be turned on at a time when ZVS is achievable. Once transistors 104, 106, and 136 are on, current 101 may flow through the load path of transistors 104, and current 105 may flow through the load path of transistor 136.

Figure 19:
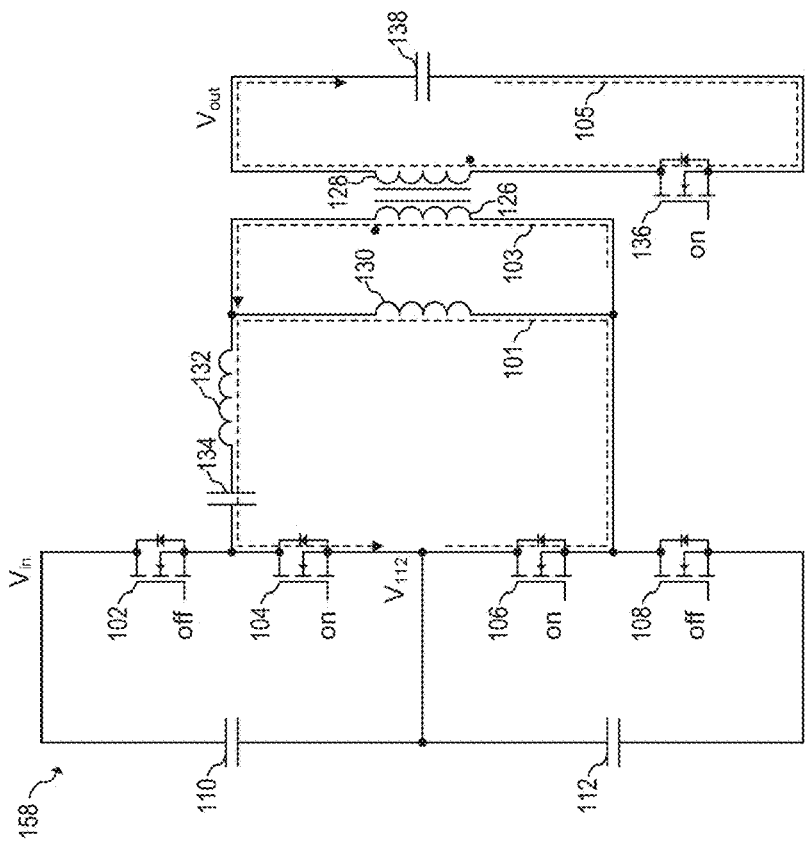

FIG. 19 shows the state of transistors and current behavior of converter 100 when converter 100 is in a fifth resonant discharge transitional state of the resonant discharge phase of the high-line voltage mode, according to an embodiment of the present invention. As shown in FIG. 18 current 100 flips polarity, in part, as a result of the resonant tank including resonant capacitor 134 and resonant inductor 132.

Current 103 may still flow through primary winding 126. Current 103, however, may be decreasing during the second resonant discharge transitional state. Consequently, current 105 may continue to flow through secondary winding 128 and the load path of transistor 136.

Figure 20:
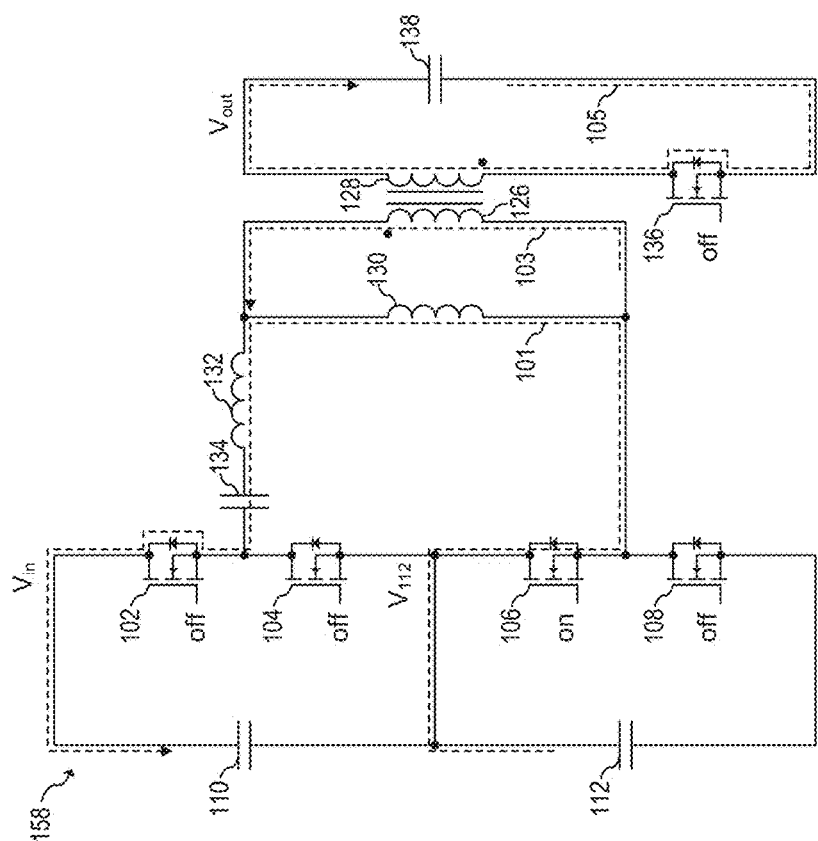

FIG. 20 shows the state of transistors and current behavior of converter 100 when converter 100 is in a sixth resonant discharge transitional state of the resonant discharge phase of the high-line voltage mode, according to an embodiment of the present invention. Transistor 104 is turned off at the beginning of the sixth resonant discharge transitional state of the high-line voltage mode. Current, therefore, circulates through the body diodes of transistor 102 and through the load path of transistor 106. The current flowing through the body diodes of transistor 102 may discharge the drain capacitances of transistor 102, causing the voltage across the load path of transistor 102 to reduce, for example, to zero volts. Current 103, if any, may flow through primary winding 126. Current 105, if any, may flow through secondary winding 128 and through the body diode of transistor 136.

Figure 21:
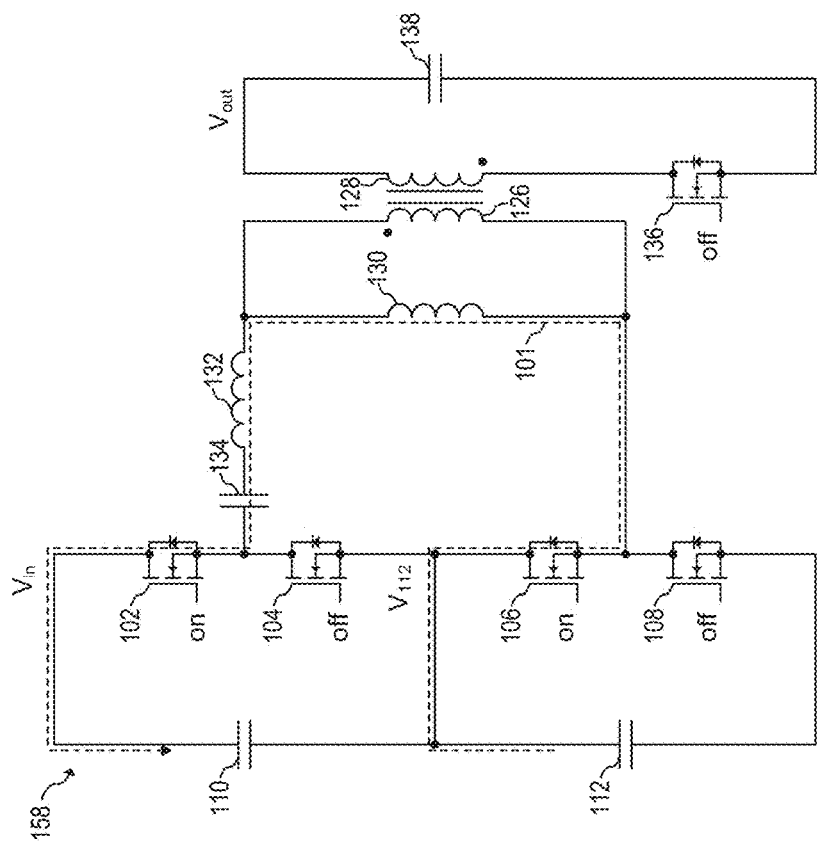

FIG. 21 shows the state of transistors and current behavior of converter 100 when converter 100 is in a second transitional charging state of the charging phase of the high-line voltage mode, according to an embodiment of the present invention. Once the voltage across the load path of transistor 102 is reduced, transistor 102 may be turned on with ZVS. Once transistors 102 and 106 are on, current 101 may flow through the load path of transistors 102 and 106. No current may flow through primary winding 126 or secondary winding 128 since transistor 136 is off and the body diode of transistor 136 is reversed biased. The first main charging state of the high-line voltage mode follows after the second transitional charging state of the high-line voltage mode, repeating the sequence.

Figure 22:
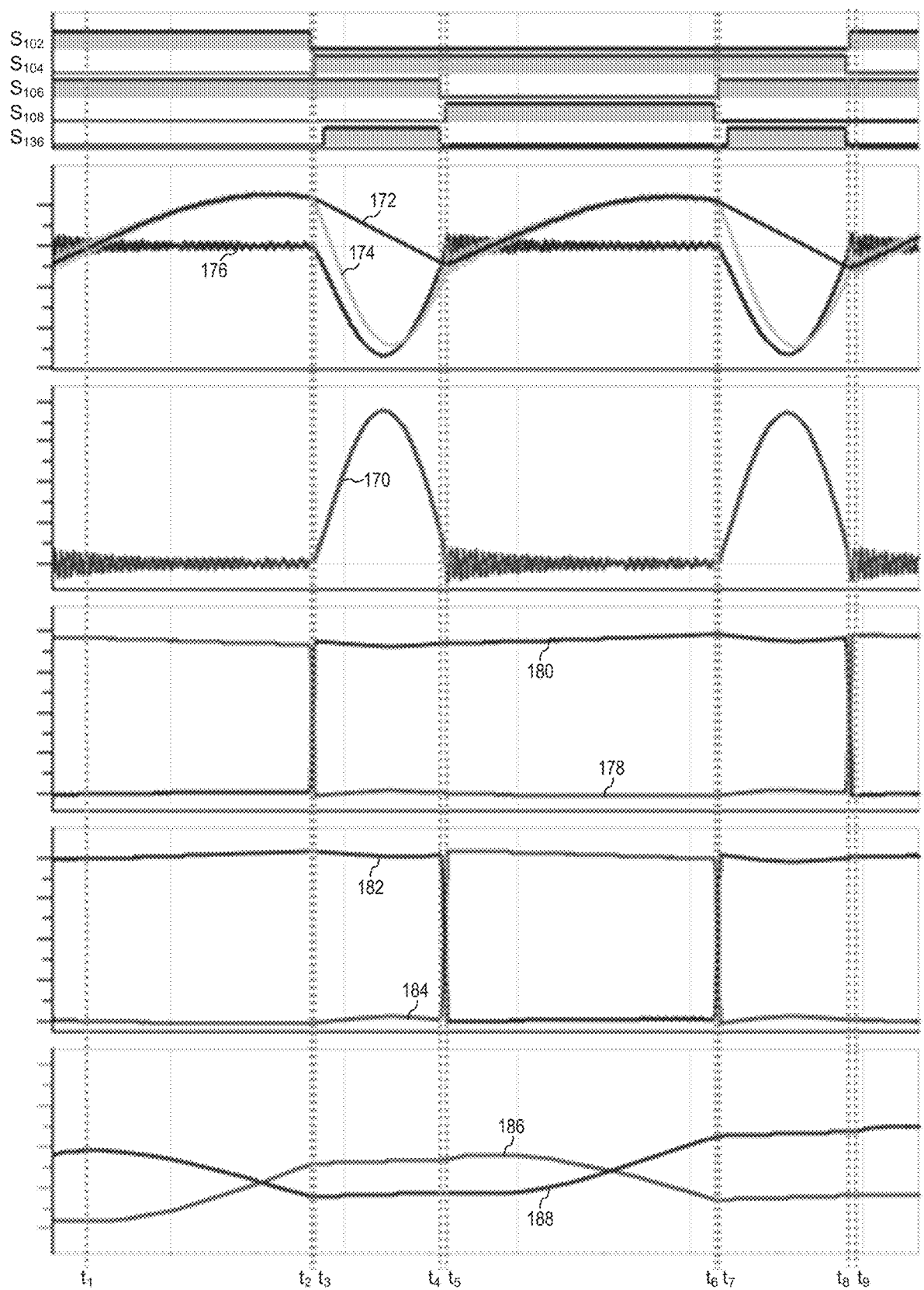
FIG. 22 illustrates waveforms of a converter during normal operation in high-line voltage mode, according to an embodiment of the present invention.

FIG. 22 illustrates waveforms of converter 100 during normal operation in high-line voltage mode, according to an embodiment of the present invention. The waveforms of FIG. 22 may be understood in view of FIGS. 1, 2 and 10-21. FIG. 22 includes curve 172 of current $I_{130}$, curve 174 of current $I_{132}$, curve 176 of current $I_{126}$, curve 170 of current $I_{128}$, curve 178 of voltage $V_{104}$, curve 180 of voltage $V_{102}$, curve 182 of voltage $V_{108}$, curve 184 of voltage $V_{106}$, curve 186 of the voltage across input capacitor 112, curve 188 of the voltage across input capacitor 110, and signals $S_{102}$, $S_{104}$, $S_{106}$, $S_{108}$, and $S_{136}$ of transistors 102, 104, 106, 108, and 136 respectively.

During the time between time $t_1$ and time $t_2$, transistors 102 and 106 are on and currents $I_{130}$ and $I_{132}$ increase while current $I_{126}$ and $I_{128}$ remain substantially at zero, as can be seen from curves 172, 174, 176, and 170. The voltages $V_{102}$ and $V_{106}$ across the load paths of transistors 102 and 106 are substantially zero, as can be seen from curves 180 and 184, respectively. The voltages across the load paths of transistors 104 and 108 are high, as can be seen from curves 178 and 182, respectively. As energy is taken from input capacitor 110, the voltage across input capacitor 110 is reduced, as can be seen from curve 188. The current flow through converter 100 during the time between time $t_1$ and time $t_2$ is also illustrated by FIG. 10.

At time $t_2$, transistor 102 is turned off. The current flow through converter 100 during the time between time $t_2$ and time $t_3$ is illustrated by FIG. 11. Current begins flowing through primary winding 126 and secondary winding 128, as shown by curves 176 and 170 respectively. The voltage $V_{104}$ across the load paths of transistors 104 drops to zero volts, as can be seen from curve 178. The voltage across transistor 136 (not shown) may also be zero volts by time $t_3$.

At time $t_3$, transistor 104 is turned on with ZVS. Transistor 136 may be turned on with ZVS a first time after transistors 104 is turned on to ensure that transistor 136 is turned on with ZVS. In some embodiments, the duration of the first time may be zero. Between time $t_3$ and time $t_4$, current $I_{132}$ becomes negative, as can be seen by curve 174. Current $I_{130}$ also becomes negative, as can be seen by curve 172. The current flow through converter 100 during the time between time $t_3$ and time $t_4$ where transistors 104, 106 and 136 are on is also illustrated by FIGS. 12 and 13.

At time $t_4$, transistors 106 and 136 are turned off. The current flow through converter 100 during the time between time $t_6$ and time $t_7$ is illustrated by FIG. 14. The voltage $V_{108}$ across the load paths of transistor 108 drops to zero volts, as can be seen from curve 182.

At time $t_5$, transistor 108 is turned on with ZVS. Currents $I_{130}$ and $I_{132}$ become positive a period of time after time $t_5$, as can be seen by curves 172 and 174, respectively. Currents $I_{130}$ and $I_3$ increase while current $I_{126}$ and $I_{128}$ remain substantially at zero, as can be seen from curves 172, 174, 176, and 170. The voltages $V_{104}$ and $V_{108}$ across the load paths of transistors 104 and 108 are substantially zero, as can be seen from curves 178 and 182, respectively. The voltages across the load paths of transistors 102 and 106 are high, as can be seen from curves 180 and 184, respectively. As energy is taken from input capacitor 112, the voltage across input capacitor 112 is reduced, as can be seen from curve 186. The current flow through converter 100 between time $t_5$ and time $t_6$ is illustrated by FIGS. 15 and 16.

At time $t_6$, transistor 108 is turned off. The current flow through converter 100 during the time between time $t_6$ and time $t_7$ is illustrated by FIG. 17. Current begins flowing through primary winding 126 and secondary winding 128, as shown by curves 176 and 170 respectively. The voltage $V_{106}$ across the load paths of transistors 106 drops to zero volts, as can be seen from curve 184. The voltage across transistor 136 (not shown) may also be zero volts by time $t_3$.

At time $t_7$, transistor 106 is turned on with ZVS. Transistor 136 may be turned on with ZVS a second time after transistors 106 is turned on to ensure that transistor 136 is turned on with ZVS. In some embodiments, the duration of the second time may be zero. Between time $t_7$ and time $t_8$, current $I_{132}$ becomes negative, as can be seen by curve 174. Current $I_{130}$ also becomes negative, as can be seen by curve 172. The current flow through converter 100 during the time between time $t_7$ and time $t_8$ where transistors 104, 106 and 136 are on is also illustrated by FIGS. 18 and 19.

At time $t_8$, transistors 104 and 136 are turned off. The current flow through converter 100 during the time between time $t_8$ and time $t_9$ is illustrated by FIG. 20. The voltage $V_{102}$ across the load paths of transistor 102 drops to zero volts, as can be seen from curve 180.

At time $t_9$, transistor 102 is turned on with ZVS. Currents $I_{130}$ and $I_{132}$ become positive a period of time after time $t_5$, as can be seen by curves 172 and 174, respectively. The current flow through converter 100 during at time $t_9$ is illustrated by FIG. 21. After current $I_{130}$ and $I_{132}$ become positive, the current flow through converter 100 is illustrated by Figure to, repeating the sequence.

Advantages of some embodiments of the present invention include that transistors with a 250 V rating may be used to operate a converter coupled to a high-line voltage source. Since the voltage across input capacitors 110 or 112 during the high-line voltage mode is similar to the voltage between input $V_{in}$ and ground during the low-line mode, there is no need to redesign the circuit to handle high-line voltage voltages. For example, a converter may operate safely with transistors rated at 250 V to 300V. The blocking transistor coupled to the secondary side of the transformer may also be implemented with a reduced voltage rating since it is exposed to a lower voltage resulting from the use of the high-line mode. Additionally, since transistors rated at lower voltage tend to have lower on-resistance, using transistors with lower rating may result in higher conversion efficiency. Some embodiments may use transformers with a small transformation ratio, such as 2 to 1, 3 to 1 or 4 to 1 ratio. Having a small transformation ratio may reduce the physical volume of the transformer.

Figure 23:
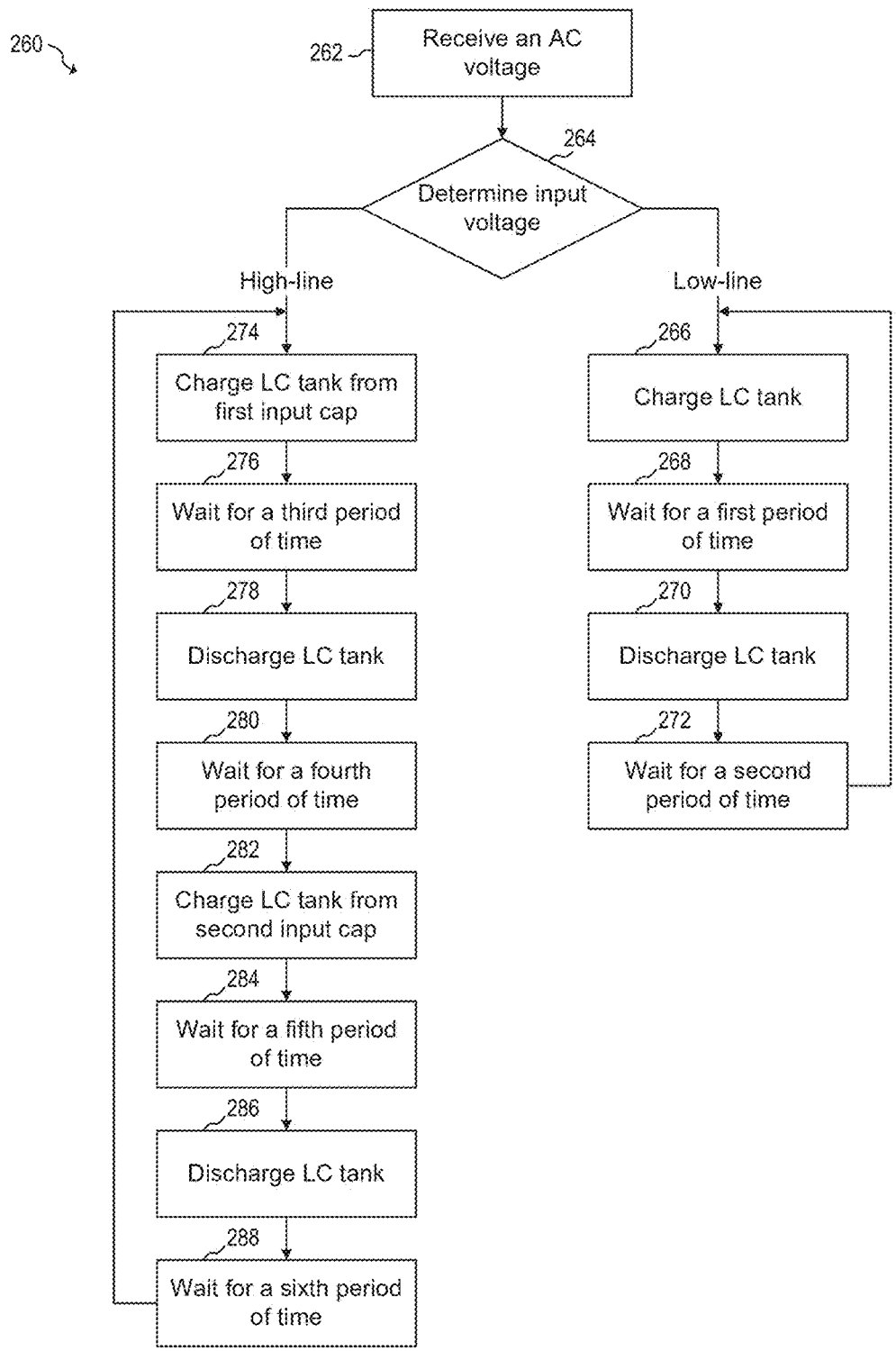
FIG. 23 illustrates a flow chart of an embodiment method of operating a converter, according to an embodiment of the present invention.

FIG. 23 illustrates a flow chart of embodiment method 260 of operating a converter, according to an embodiment of the present invention. Method 260 may be implemented in converter 100, but it may also be implemented in other circuit architectures and in other ways known in the art. The discussion that follows assumes that converter 100, as illustrated in FIG. 1, implements method 260 of operating a converter.

The converter receives an AC voltage during step 262. The AC voltage may be, for example, a high-line AC voltage or a low-line AC voltage. During step 264, the converter determines the type of AC voltage received. Step 264 may be skipped in cases such as when the converter is pre-configured to receive a particular type of voltage. In some embodiments, the AC voltage may be dynamically sensed in order to determine whether to operate in low-line mode or in high-line mode. As a result, a converter operating normally in high-line mode may transition to low-line mode during an abnormal event, such as, for example, a brownout condition. Some embodiments may also transition from high-line mode to low-line mode dynamically during normal operation. For example, when the instantaneous voltage of the AC voltage is higher than a predetermined threshold, such as, for example, 140 V, high-line mode is used, and when it is below, low-line mode is used. The capacitances may be chosen to enable operation of the power converter at the lowest AC input voltage. For an adapter this operation point is typically 90V AC. If the power converter operates at 900 V AC with full power there may be enough energy stored in the input capacitors that the converter may operate high-line mode without transitioning into low-line mode. In other embodiments, for example, in which significant power der-ating, such as 30% of peak power only at 90V AC is acceptable, the capacitances can be chosen significantly smaller. In this case, during high-line mode the voltage of input Vi, across input capacitors 110 and 112 may drop such across the period of the sinusoidal input voltage such that the converter transitions into low-line mode.

When a low-line voltage is received, an LC tank, such as the LC tank including resonant capacitor 134 and resonant inductor 132, is connected to a first terminal of a first input capacitor and to a second terminal of a second input capaci-tor, such as of input capacitors 110 and 112, to charge the LC tank during step 266. Connecting the LC tank to the first terminal of the first input capacitor and to the second terminal of the second input capacitor may be accomplished by turning on transistors, such as transistors 102 and 108. During step 268, the LC tank is charged for a first period of time during step 266. The first period of time may be determined by a PWM signal (not shown). Alternatively, the first period of time may be pre-configured, or determined in other ways known in the art.

During step 270, the LC tank is disconnected from the first terminal of the first input capacitor and from the second terminal of the second input capacitor by, for example, turning off transistors 102 and 108. During step 272, the LC tank is discharged in a resonant way by allowing the current to recirculate, for example, by turning on transistors 104 and 106. Discharging the LC tank transfers energy to an output of the converter, such as by transferring energy to secondary side of transformer 168. Discharging the LC tank in a resonant way also discharges the drain capacitances of the transistors of the converter allowing the transistors of the converter to turn on with ZVS. Step 266 is executed after step 272, repeating the sequence.

When a high-line voltage is received, the LC tank is connected to the first and second terminals of the first input capacitor to charge the LC tank during step 274. Connecting the LC tank to the first and second terminals of the first input capacitor may be accomplished by turning on transistors, such as transistors 102 and 106. During step 276, the LC tank is charged for a third period of time. The third period of time may be determined by a PWM signal (not shown) and by a voltage at a node between the first input capacitor and the second input capacitor, such as the node where the second terminal of the first input capacitor is connected to the first terminal of the second input capacitor, such as node $V_{112}$. Alternatively, the third period of time may be pre-configured, or determined in other ways known in the art.

During step 278, the LC tank is disconnected from the first terminal of the first input capacitor by, for example, turning off transistors 102. During step 280, the LC tank is discharged in a resonant way by allowing the current to recirculate, for example, by turning on transistors 104. Discharging the LC tank transfers energy to the output of the converter. Discharging the LC tank in a resonant way also discharges the drain capacitances of the transistors of the converter allowing the transistors of the converter to turn on with ZVS.

During step 282 the LC tank is connected to the first and second terminals of the second input capacitor to charge the LC tank. Connecting the LC tank to the second may be accomplished by turning on transistors, such as transistors 104 and 108. During step 284, the LC tank is charged for a fifth period of time. The fifth period of time may be determined by a PWM signal (not shown) and by the voltage at the node between the first and second input capacitors. Alternatively, the fifth period of time may be pre-configured, or determined in other ways known in the art.

During step 282, the LC tank is disconnected from the second terminal of the second input capacitor by, for example, turning off transistors 108. During step 284, the LC tank is discharged in a resonant way by allowing the current to recirculate, for example, by turning on transistors 106. Discharging the LC tank transfers energy to the output of the converter. Discharging the LC tank in a resonant way also discharges the drain capacitances of the transistors of the converter allowing the transistors of the converter to turn on with ZVS. Step 274 is executed after step 284, repeating the sequence.

As shown in FIG. 1, output $V_{out}$ may be provided by PCRC stage 158 in parallel with compensation stage 162. In the absence of compensation stage 162, the voltage at output $V_{out}$ may exhibit ripple, which may be substantial in cases where the input capacitors, such as input capacitors 110 and 112, are small. Compensation stage 162, therefore, may be used to regulate the voltage at output $V_{out}$ to reduce or eliminate output ripple when the input capacitors 110 and 112 are small.

Figure 24:
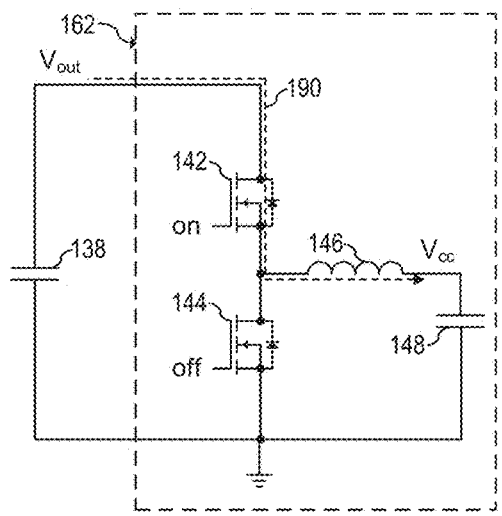
FIGS. 24-27 illustrate a possible implementation of a compensation stage, according to an embodiment of the present invention.
Figure 26:
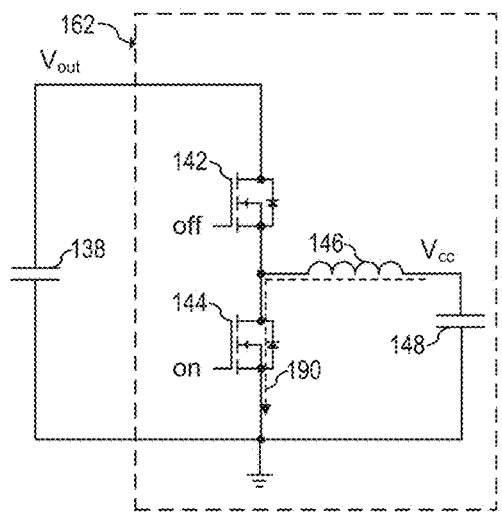
Figure 25:
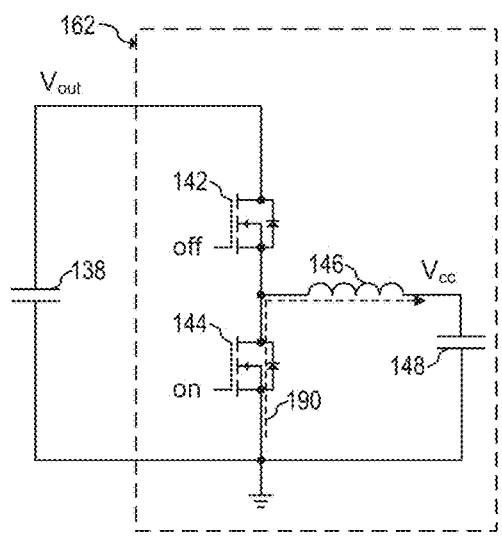
Figure 27:
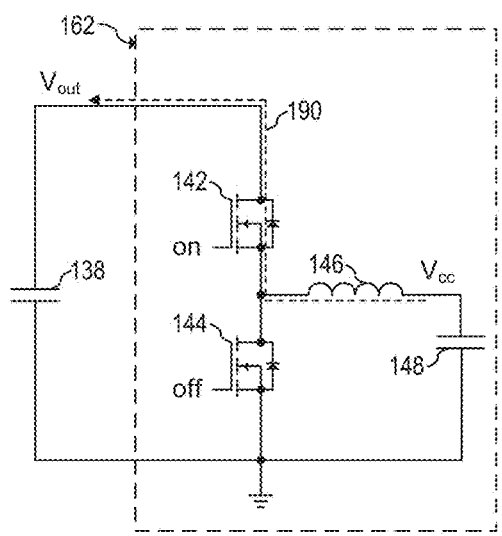

Compensation stage 162 may be implemented as a bidi-rectional converter. An implementation of compensation stage 162 is described in patent application Ser. No. 15/265,686, which is hereby incorporated by reference in its entirety. FIGS. 24-27 illustrate a possible implementation of compensation stage 162, according to an embodiment of the present invention. Specifically, FIGS. 24 and 25 show the flow of current when the voltage at output $V_{out}$ is higher than a predetermined voltage, and FIGS. 26 and 27 show the flow of current when the voltage at output $V_{out}$ is lower than the predetermined voltage. As shown in FIGS. 24 and 25, when the voltage at output $V_{out}$ is higher than a predetermined voltage, transistors 142 and 144 may switch such that current flows into storage capacitor 148. Compensation stage 162, therefore, behaves as a buck converter having as input output $V_{out}$ and as output node $V_{cc}$ when the voltage at output $V_{out}$ is higher than the predetermined voltage. As shown in FIGS. 26 and 27, when the voltage at output $V_{out}$ is lower than the predetermined voltage, transistors 142 and 144 may switch such that current flows into output $V_{out}$. Compensation stage 162, therefore, behaves as a boost converter having as input node $V_{cc}$ and as output $V_{out}$ when the voltage at output $V_{out}$ is lower than the predetermined voltage. Compensation stage 162 may be implemented in other ways known in the art. For example, compensation stage 162 may include a boost or buck-boost converter to transfer energy storage capacitor 148.

Compensation stage 162 may operate at a switching frequency of 800 KHz or higher. Alternatively, other frequencies may be used. Operating compensation stage 162 at high frequencies, such as 800 KHz, allows the voltage output $V_{out}$ to be regulated with little or no ripple even when node $V_{cc}$ exhibits substantial ripple. PCRC stage 158, therefore, may regulate the voltage at node $V_{cc}$ by switching at a relatively low frequency, such as 150 kHz or lower, without affecting the voltage regulation of output $V_{out}$. Other frequencies may be used.

Figure 28:
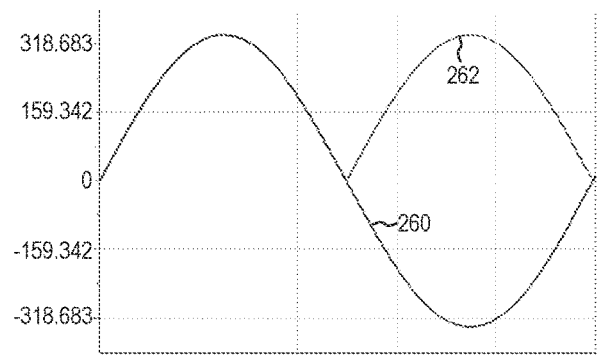
FIGS. 28-31 show voltage waveforms for a voltage source and an input node, according to an embodiment of the present invention.
Figure 29:
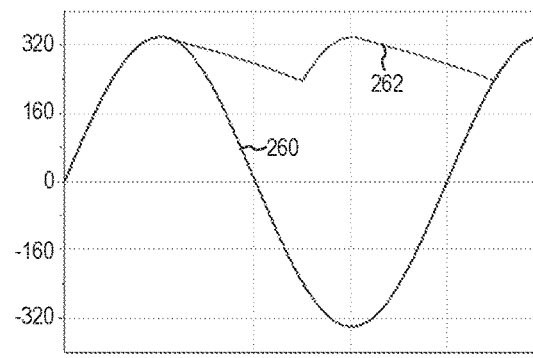
Figure 30:
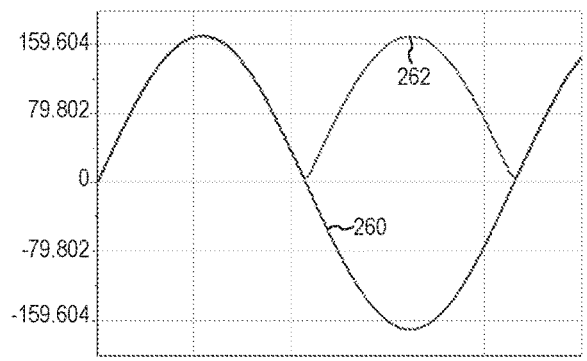
Figure 31:
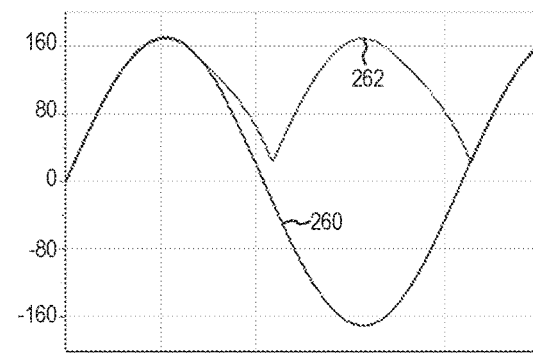

Input voltage $V_{in}$ may vary depending on the loading condition of converter 100. FIGS. 28-31 show voltage waveforms for voltage source 124 and input $V_{in}$ for a system using input capacitors of 2 uF, according to an embodiment of the present invention. Curve 260 represents the voltage at voltage source 124, and curve 262 represents the voltage at input $V_{in}$. FIG. 28 illustrates the voltage waveforms for voltage source 124 and input $V_{in}$ where voltage source 124 is a high-line voltage source and converter 100 is fully loaded. FIG. 29 illustrates the voltage waveforms for voltage source 124 and input $V_{in}$, where voltage source 124 is a high-line voltage source and converter 100 is 10% loaded. FIG. 30 illustrates the voltage waveforms for voltage source 124 and input $V_{in}$ where voltage source 124 is a low-line voltage source and converter 100 is fully loaded. FIG. 29 illustrates the voltage waveforms for voltage source 124 and input $V_{in}$ where voltage source 124 is a low-line voltage source and converter 100 is 10% loaded.

As can be seen from FIGS. 28-31, the voltage at input $V_{in}$ may vary depending on factors such as the converter loading and the type of power received. Having a compensation stage coupled to a PCRC stage, therefore, allows for a converter implementation using small input capacitors while reducing or eliminating output ripple. Furthermore, dynamic load changes can be equalized through the compensation stage, which may operate at very high switching frequency. In other words, a converter can be built with very fast reaction on dynamic load jumps without operating the main converter at a very high switching frequency. Yet, the main converter can be designed for a fixed output voltage and can be optimized for medium to full load operation. In very light load operation, the main converter may stop operation with the load being supported only by the compensation stage.

The efficiency of converter 100 may be further optimized by controlling when PCRC stage 158 actively transfers energy to the secondary side of transformer 168. For example, when the voltage at input $V_{in}$, is low, such as at zero volts, PCRC stage 158 may stop switching. The voltage at output $V_{out}$ may be regulated by compensation stage 162 during that time.

Figure 32:
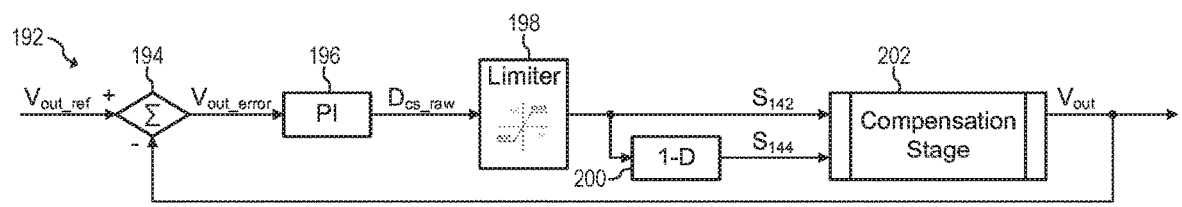
FIG. 32 shows a possible implementation of a control diagram of a compensation stage, according to an embodiment of the present invention.

FIG. 32 shows control diagram 192 of compensation stage 162, according to an embodiment of the present invention. Control diagram 192 includes summation block 194, proportional-integral (PI) controller block 196, limiter block 198, duty cycle inverter block 200 and compensation stage block 202. Control diagram 192 may be implemented with converter 100. Alternatively, control diagram 192 may be implemented with other circuit architectures and in other ways known in the art. The discussion that follows assumes that converter 100, as shown in FIG. 1, implements control diagram 192 of operating a compensation stage.

As can be seen from FIG. 32, summation block 194 receives reference output voltage $V_{out\_ref}$ and the voltage at output $V_{out}$, subtracts them, and generates error signal $V_{out\_error}$. PI controller block 196 may provide dynamic compensation for compensation stage 162 and generates signal $D_{cs\_raw}$ that determines the switching pattern of signals $S_{142}$ and $S_{144}$. In other words, as the voltage at output $V_{out}$ varies, the switching pattern of signals $S_{142}$ and $S_{144}$ is modified in order to reduce the magnitude of error signal $V_{out\_error}$, thereby regulating the voltage at output $V_{out}$.

Duty cycle inverter block 200 may be used to ensure that signals $S_{142}$ and $S_{144}$ are non-overlapping. Limiter block 198 may be used to ensure that the duty cycle of signals $S_{142}$ and $S_{144}$ remain within a safe range for a particular system.

Figure 33:
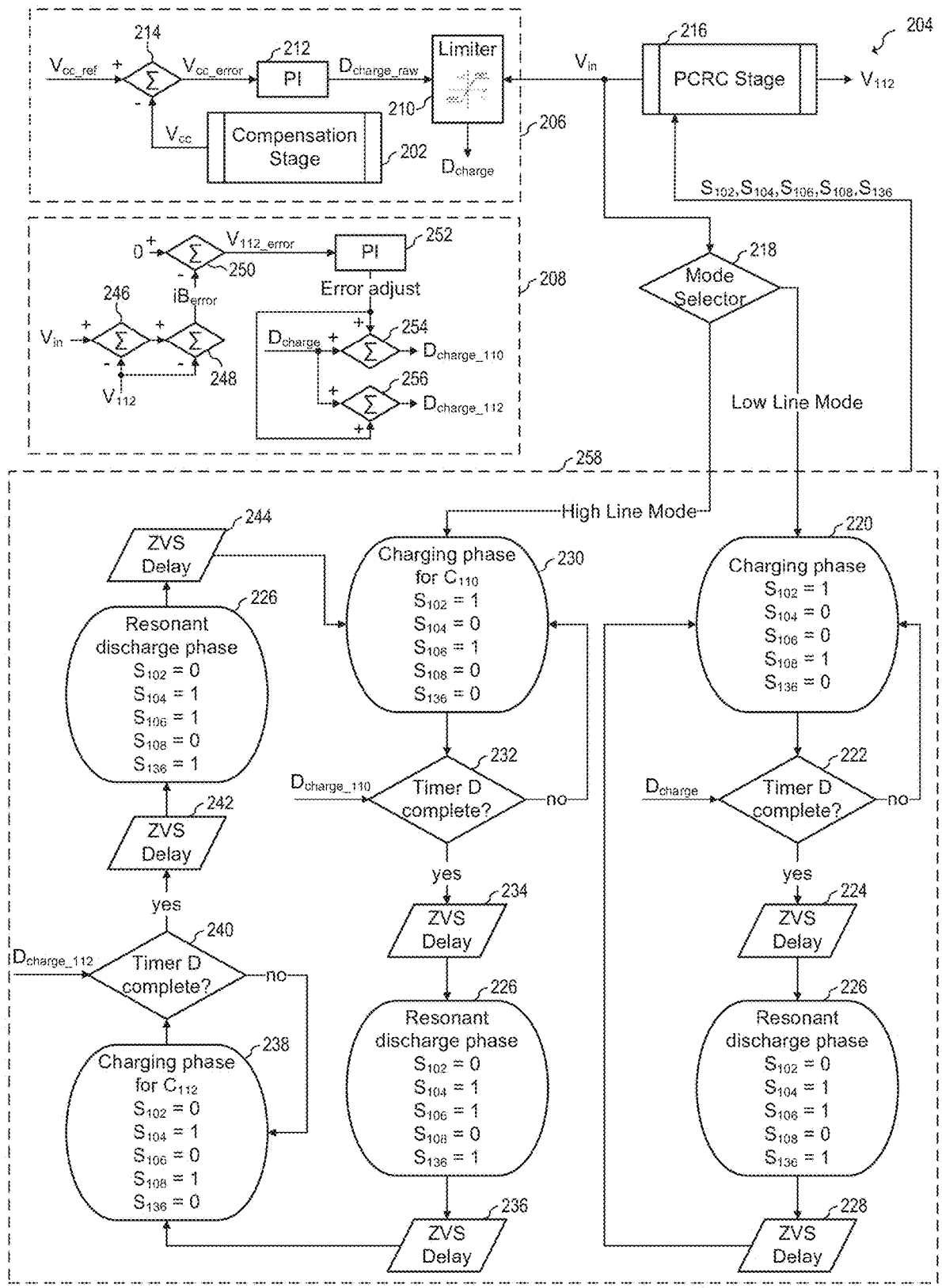
FIG. 33 shows a possible implementation of a control diagram of a PCRC stage, according to an embodiment of the present invention.

FIG. 33 shows control diagram 204 of PCRC stage 158, according to an embodiment of the present invention. Control diagram 204 includes regulation block 206, capacitor compensation block 208, state machine 258, mode selector block 218 and PCRC stage block 216. During normal operation, control diagram 204 may regulate the voltage at nodes $V_{cc}$ and $V_{112}$ by adjusting the switching pattern of signals $S_{102}$, $S_{104}$, $S_{106}$, $S_{108}$ and $S_{136}$. Control diagram 204 may be implemented with converter 100. Alternatively, control diagram 204 may be implemented with other circuit architectures and in other ways known in the art. The discussion that follows assumes that converter 100, as shown in FIG. 1, implements control diagram 204 of operating a converter.

Regulation block 206 includes summation block 214, PI controller block 212, limiter block 210 and compensation stage block 202. During normal operation, regulation block 206 regulates the voltage at node $V_{cc}$. Summation block 214 receives reference voltage $V_{cc\_ref}$ and the voltage at node $V_{cc}$, subtracts them, and generates error signal $V_{cc\_error}$. PI controller block 212 generates signal $D_{change\_raw}$ that is used to determine the switching pattern of signals $S_{102}$, $S_{104}$, $S_{106}$, $S_{108}$ and $S_{136}$. In other words, as the voltage at node $V_{cc}$ varies, the switching pattern of signals $S_{142}$ and $S_{144}$ is modified in order to reduce the magnitude of error signal $V_{cc\_error}$, thereby regulating the voltage at node $V_{cc}$. Limiter block 210 may be used to ensure that signal $D_{change\_raw}$ remains within a safe range for a particular system. In some embodiments, the safe range may depend on the input voltage or voltage source type.

Mode selector 218 is used to select a control flow based on whether voltage source 124 provides high-line voltage or low-line voltage. The mode selection may be performed automatically upon detecting the type of power available to the system. Alternatively, the mode selection may be done manually or may be preset when the power supply is manufactured.

State machine 258 includes charging states 220, 230, and 238, resonant discharge state 226, ZVS delay blocks 222, 224, 234, 236, 242, and 244, and timer blocks 222, 232, and 242. When low-line mode is selected, charging state 220 is followed by resonant discharge state 226, which is then followed by charging state 220, repeating the sequence. The duration of charging state 220 determines the amount of energy transferred to the secondary side of transformer 168 and is determined by signal $D_{change\_raw}$ and timer block 222. ZVS delay blocks 224 and 228 ensure that transistors are turned on with ZVS while transitioning between charging state 220, resonant discharge state 226, and any transitional states (not shown). Examples of charging state 220, resonant discharge state 226, and transitional states, as implemented in converter 100, are illustrated in FIGS. 3-8.

When high-line mode is selected, charging state 230 is followed by resonant discharge state 226, which is then followed by charging state 238, which is followed by resonant discharge state 226, which is then followed by charging state 230, repeating the sequence. The duration of charging states 230 and 238 determine the amount of energy transferred to the secondary side of transformer 168. The duration of charging state 230 is determined by timer block 232 and signal $D_{change\_110}$, which is generated by capacitor compensation block 208 and is based on signal $D_{change\_raw}$. The duration of charging state 238 is determined by timer block 240 and signal $D_{change\_112}$, which is generated by capacitor compensation block 208 and is based on signal $D_{change\_raw}$. ZVS delay blocks 234, 236, 242 and 244 ensure that transistors are turned on with ZVS while transitioning between charging states 230 and 236, resonant discharge state 226, and any transitional states (not shown). Examples of charging states 230, 236, resonant discharge state 226, and transitional states, as implemented in converter 100, are illustrated in FIGS. 10-21.

ZVS delay blocks 222, 224, 234, 236, 242, and 244 may have a predetermined time, such as 100 ns or less. Other predetermined times may be used. All ZVS delays blocks may use the same predetermined times. Alternatively, each ZVS delay block may use different times, for example, to optimize the ZVS delay times for each particular transition. Since the time to discharge a drain capacitance may depend on the voltage at input $V_{in}$, the time associated with ZVS delay blocks 222, 224, 234, 236, 242, and 244 may be based on the voltage at input node $V_{in}$. Some embodiments may determine the time associated with ZVS delay blocks 222, 224, 234, 236, 242, and 244 by detecting zero-crossings or other techniques known in the art. Optimizing the time associated with ZVS delay blocks 222, 224, 234, 236, 242, and 244 may allow charging states 220, 230, and 238 to have more time available and may be able to transfer more energy to the secondary side of transformer 168.

Ideally, the voltages across input capacitors 110 and 112 are identical. In practice, however, the dynamic voltages across input capacitors 110 and 112 may be different. Capacitor compensation block 208 may be used to compensate for any differences in voltages across input capacitors 110 and 112 by extending the duration of either charging state 230 or charging state 238. For example, when the voltage across input capacitor 110 is lower than the voltage across input capacitor 112, charging state 230 would transfer less energy to the secondary side of transformer 168 than charging state 238 if both charging state durations are equal. By extending the duration of charging state 230, it is possible to have charging states 230 and 238 transfer the same amount of energy to the secondary side of transformer 168. Similarly, when the voltage across input capacitor 110 is higher than the voltage across input capacitor 112, the duration of charging state 238 may be extended such that charging states 230 and 238 transfer the same amount of energy to the secondary side of transformer 168. The control loop automatically adjusts signal $D_{change}$ such that the total desired amount of energy is transferred. Alternatively, the capacitor compensation block 208 may be omitted when using equal duty cycles for $D_{change\_110}$ and $D_{change\_112}$, allowing the control loop to automatically compensate for any differences voltage across input capacitors 110 and 112 and achieve a natural balancing of input capacitances. For example, in case the voltage across input capacitor 112 is higher than the voltage across input capacitor 110, more energy will be transferred from input capacitor 112 than from input capacitor 110. Using identical duty cycles for transferring energy from each input capacitor will naturally balance the input voltages.

Capacitor compensation block 208 may be implemented by summation blocks 246, 248, 250, 254, and 256, and PI controller 252. Summation blocks 246 and 248 implement Equation 4, generating error signal $iB_{error}$. Equation 4 is given by $$iB_{error} = (V_{in} - V_{112}) - V_{112} \qquad (4)$$

where error signal $iB_{error}$ is a measure of how different are the voltages across input capacitors 110 and 112. Signal $V_{112\_error}$ represents how far the voltage at node $V_{112}$ is from $$\frac{V_{in}}{2}.$$

PI controller 252 generates signals $D_{change\_110}$ and $D_{change\_112}$ such the same amount of energy is transferred by charging states 230 and 238, respectively.

Figure 34:
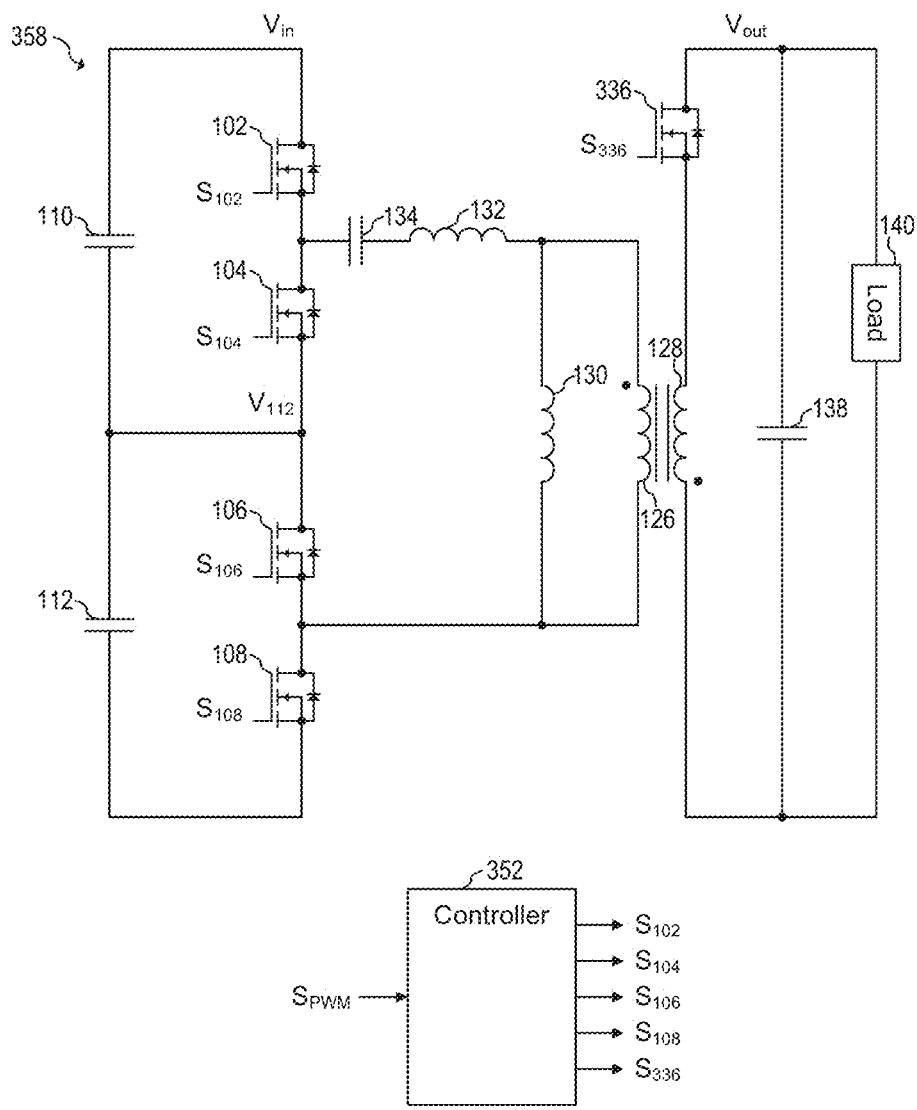
FIG. 34 shows a PCRC stage, according to an embodiment of the present invention.

The PCRC stage may be implemented in various ways. For example, FIG. 34 shows PCRC stage 358, according to an embodiment of the present invention. PCRC stage 358 may operate in a similar manner than PCRC stage 158. Similar to PCRC 158, PCRC 358 may be coupled to a compensation stage. PCRC 358, however, implements transistor 336 on the other side of secondary winding 128, when compared with transistor 136. PCRC stage 158 and PCRC stage 358 may also be referred to as cascaded hybrid flyback or PCRC stages. A person skilled in the art may apply the modifications described in this paragraph to other PCRC stages described herein.

Figure 35:
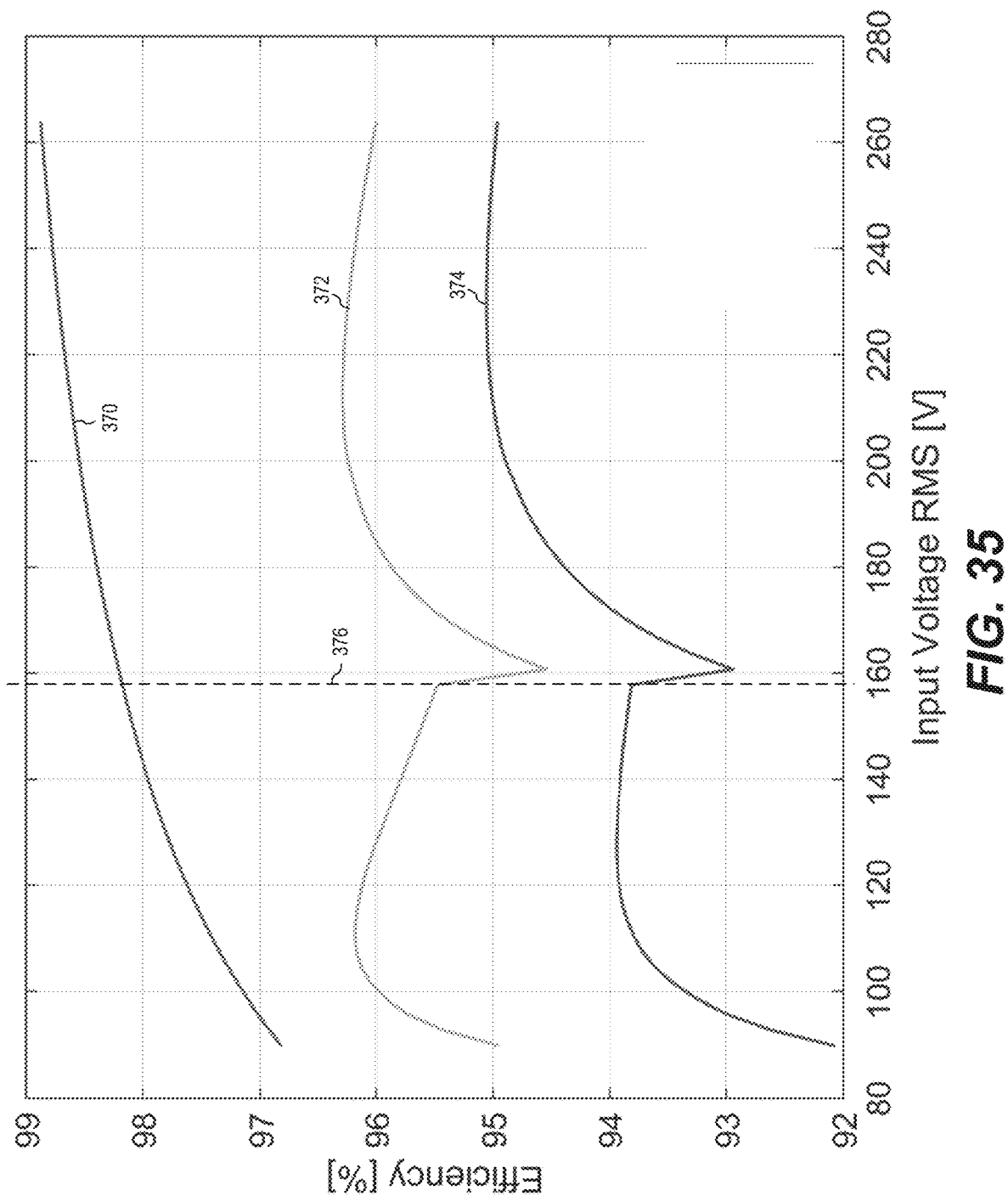
FIG. 35 illustrates efficiency waveforms of a PCRC stage, according to an embodiment of the present invention.

FIG. 35 illustrates efficiency waveforms of a converter, such as converter 100, using a cascaded hybrid flyback or PCRC stage, according to an embodiment of the present invention. FIG. 35 includes curve 372 of the efficiency of PCRC 158 or 358, curve 370 of efficiency of the rectification stage, which includes EMI filter 122 and rectifier circuit 160, and curve 374 of total efficiency of the converter. Curve 376 shows the transition voltage between low-line mode and high-line mode. It is understood that a person skill in the art may select a different transition voltage to optimize the performance of the converter.

As shown in FIG. 35, the efficiency of the rectification stage increases with the voltage at input $V_{in}$. The efficiency of the rectification stage is not affected by the transition between low-line mode and high-line mode, as shown by curve 370. In contrast, the efficiency of the PCRC stage changes with the transition between low-line mode and high-line mode, as shown by curve 372 and curve 376. The total efficiency of the converter is essentially the efficiency resulting from the contributions from the rectification stage and the PCRC stage, as shown by curve 374.

Figure 36:
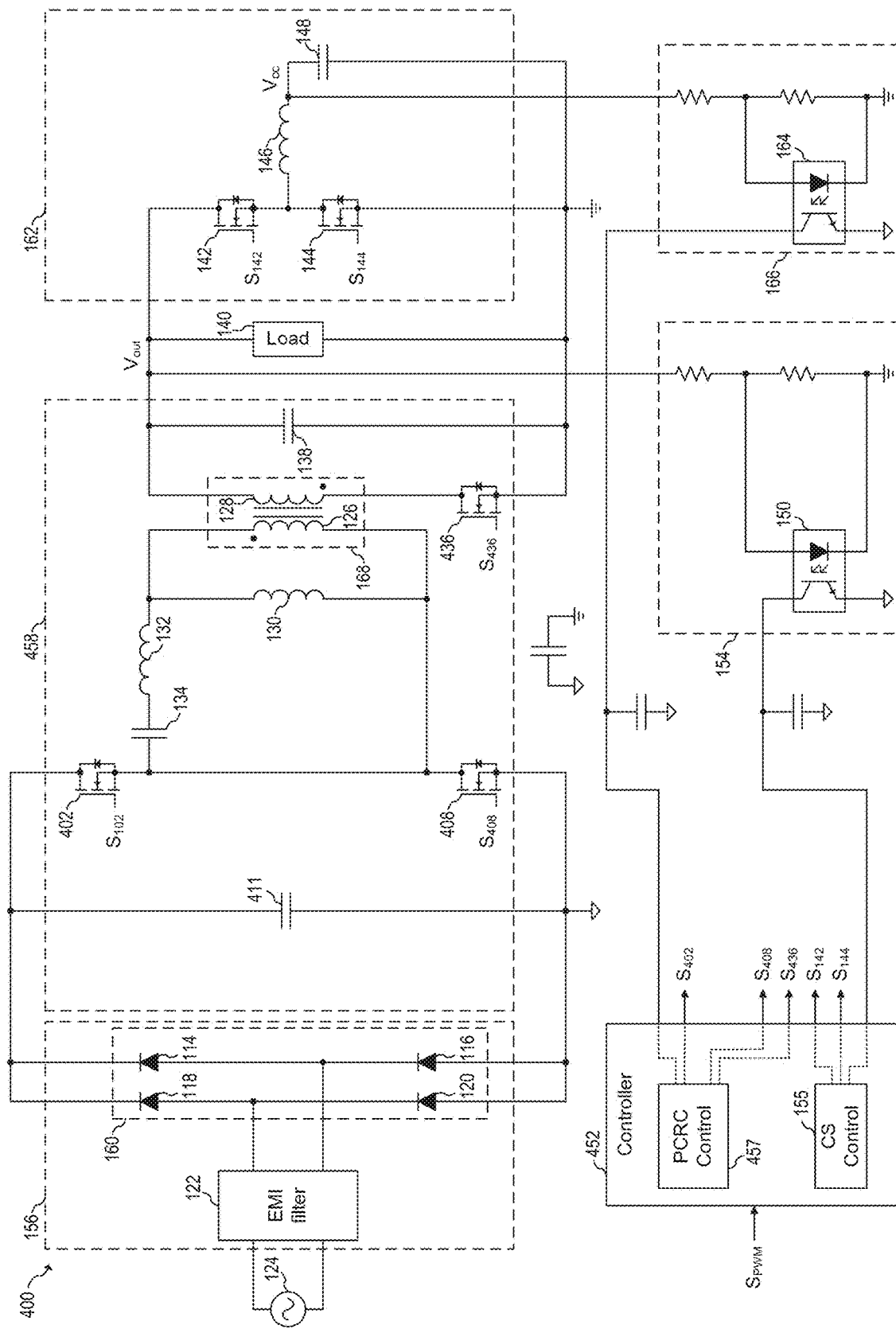
FIG. 36 shows a converter, according to another embodiment of the present invention.

FIG. 36 shows converter 400 with PCRC stage 458, according to another embodiment of the present invention. Converter 400 may operate in a similar manner than converter 100. Converter 400, however, implements PCRC 458 instead of PCRC 158. PCRC stage 458 may operate in a similar manner than PCRC stage 358. Similar to PCRC 358, PCRC 458 may be coupled to a compensation stage. PCRC 458, however, implements transistors 408 and 408 instead of transistors 102, 104, 106 and 108. As a result, PCRC 458 operates in a single mode of operation rather than switching between low-line mode and high-line mode. PCRC stage 458 may also be referred to as a hybrid flyback or non-cascaded PCRC stage.

Advantages of some embodiments of the present invention include that the PCRC stage may be implemented with two transistors on the primary side while still achieving ZVS.

Figure 37:
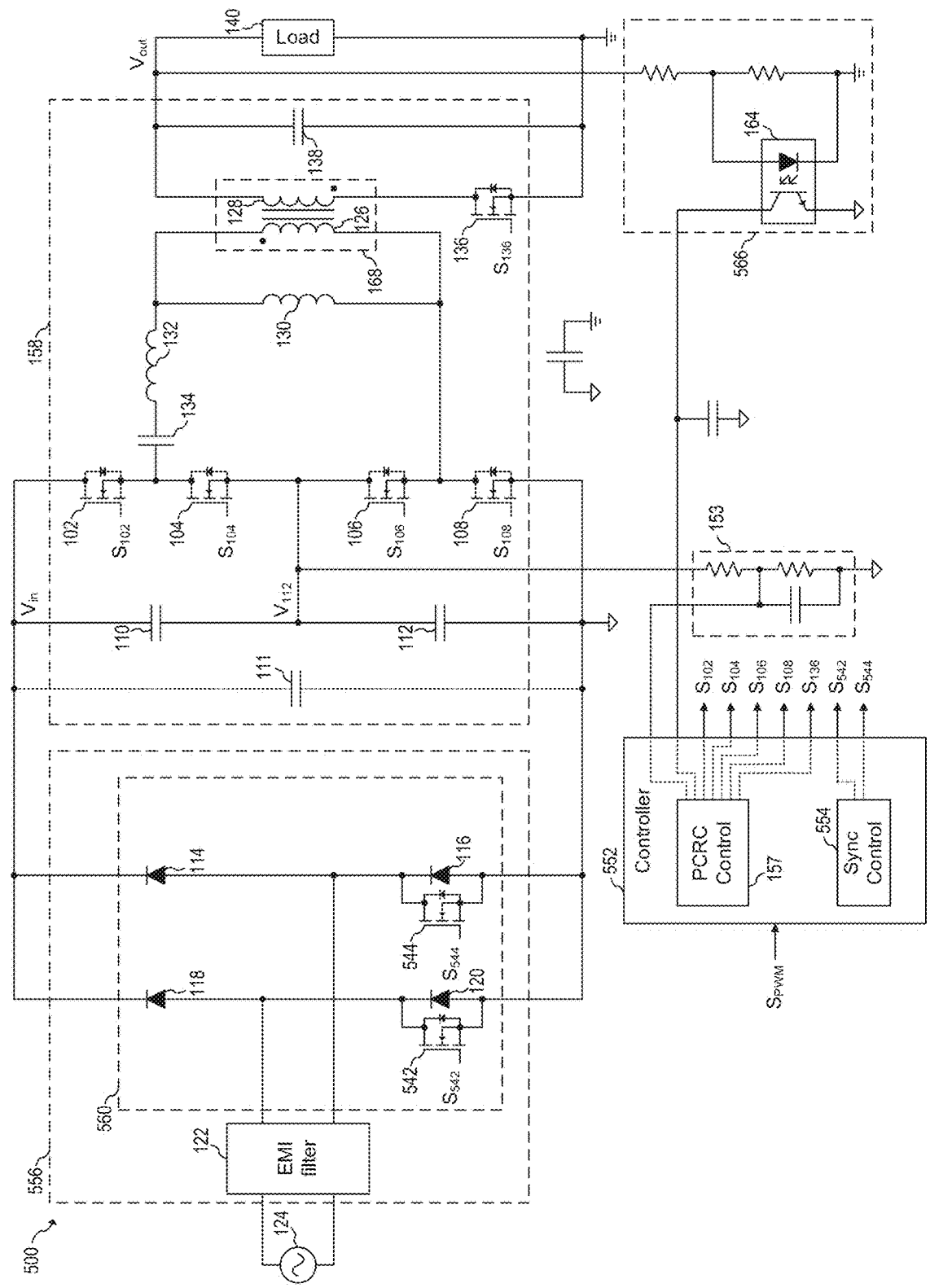
FIG. 37 shows a converter according to yet another embodiment of the present invention.

The efficiency of a converter may be improved by using synchronous rectification techniques. For example, FIG. 37 shows converter 500 using synchronous rectification MOSFETs parallel to the bridge rectifier, according to an embodiment of the present invention. Converter 500 may operate in a similar manner than converter 100. Converter 500, however, implements low-side synchronous rectification in rectifier circuit 560 by including transistors 542 and 544 in parallel with transistors 120 and 116, respectively. Other implementations of synchronous rectification, such as synchronous rectification in parallel to all rectifier diodes 114, 116, 118, 120, may be used. Using synchronous rectification techniques may improve the efficiency of the rectifier circuit, thereby improving the total efficiency of the converter. Using synchronous rectification techniques improves the efficiency of the converter especially at low input voltages, where the losses in the rectification stage are highest, as shown by curve 370 of FIG. 35. As the full load operation at low AC input voltage may present thermal challenges, increasing the efficiency at low AC input voltages helps to further increase power density by, for example, increasing the switching frequency of the PCRC stage. For example, GaN HEMTs may be used to allow operation of the converter at 500 kHz and higher. Thus, synchronous rectification techniques may help to achieve higher efficiency for the entire converter, including at low AC input voltages.

Converter 500 also does not implement a compensation stage, such as compensation stage 162. Instead, converter 500 uses higher capacitances for input capacitors 110 and 112 and optional input capacitor 111 when compared with the capacitances used in converter 100. Converter 500 may be implemented with a compensation stage.

Figure 38:
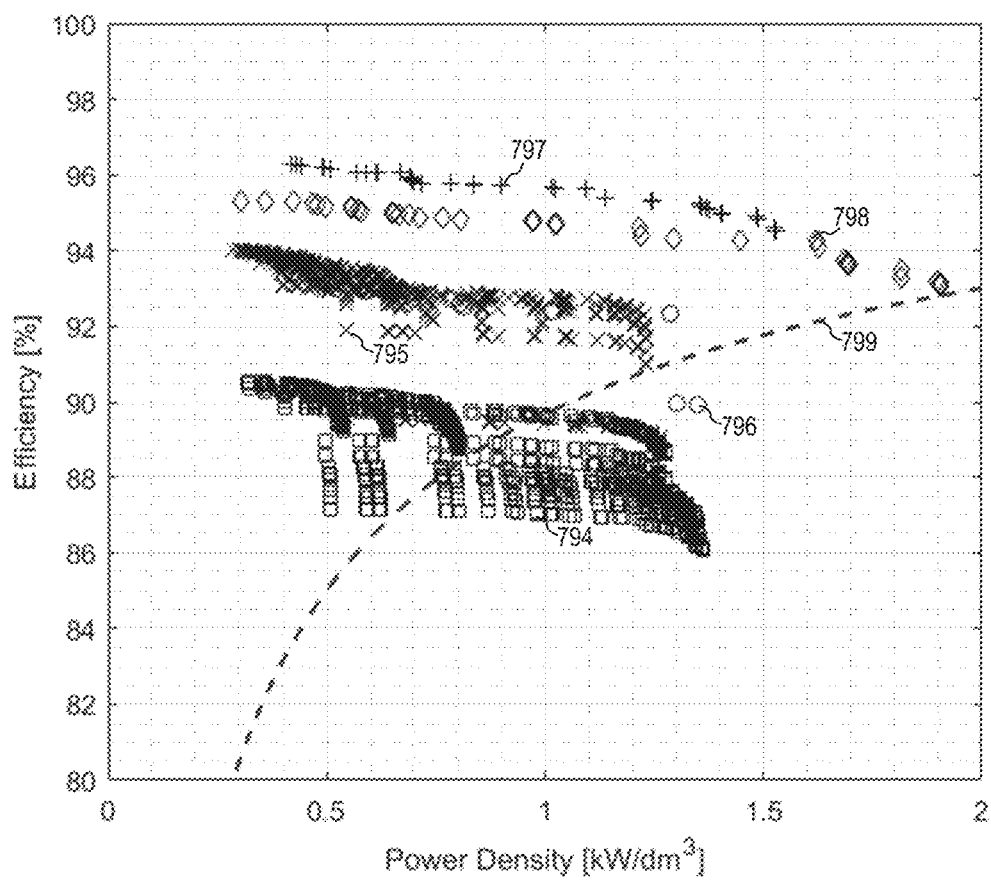
FIGS. 38 and 39 illustrate a Pareto front analysis comparing efficiency and power density performance of various embodiments of the present invention.
Figure 39:
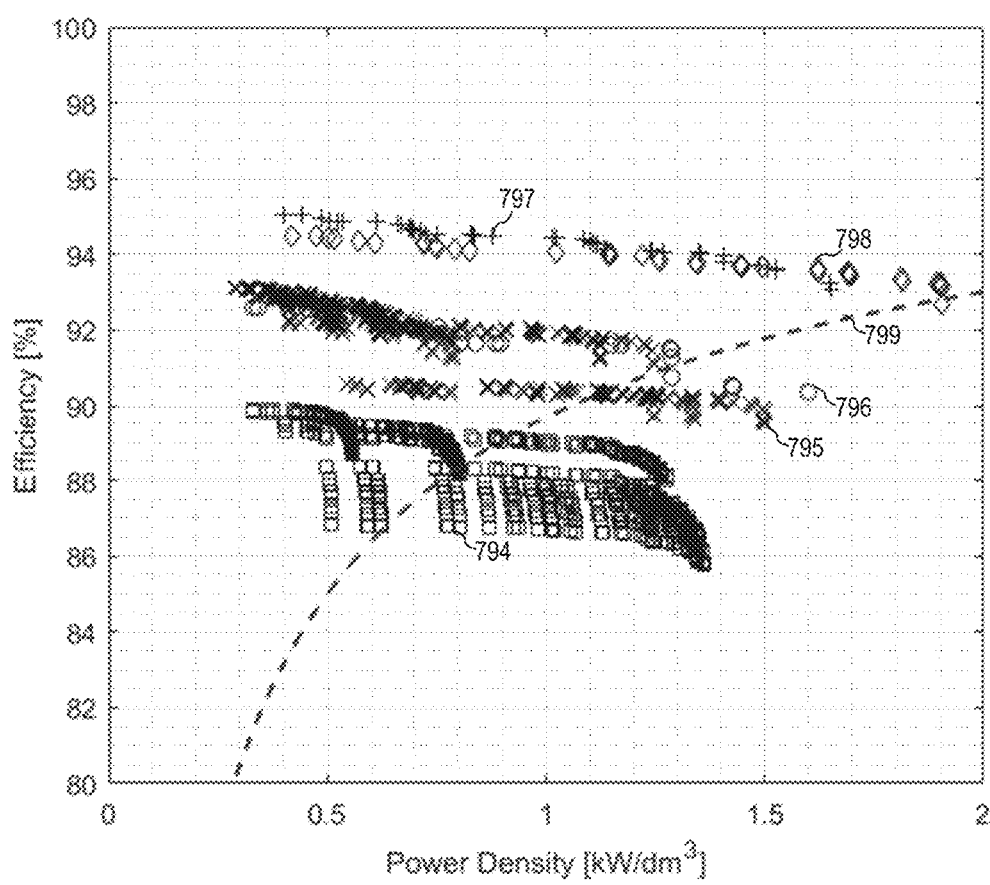

FIGS. 38 and 39 illustrate Pareto front analyses comparing the efficiency and power density performance of various embodiments of the present invention. In particular, the Pareto analyses of FIGS. 38 and 39 illustrate the result of simulations of various converter topologies with different switching frequency, different transformer design (core sizes, windings structures) but same operation point. (full load, 4 A, 16.25 A out; 110V AC and 230V AC, respectively). Controller losses of 150 mW are taking into account. Also 20% space is added to the physical component sizes in the calculation of the power density to allow meaningful physical arrangement of components. FIG. 38 illustrates a Pareto analysis of the various converters while receiving an input voltage of 230 $V_{rms}$, with loading of 16.25 A. FIG. 39 illustrates a Pareto analysis of the various converters while receiving an input voltage of 110 $V_{rms}$ and with loading of 4 A. FIGS. 38 and 39 include points 794 of a PFC flyback with compensation stage, points 795 of a fixed output voltage flyback with a subsequent buck stage, points 796 of a wide range flyback stage, points 797 of a cascaded hybrid flyback or PCRC stage according to one embodiment of this invention, points 798 of a hybrid flyback (or non-cascaded) PCRC stage, and curve 799 of an isothermal line of 80° C. surface temperature of the converter. In this specific example, the converter illustrated may operate above or to the left of isothermal line (curve 799) for proper operation. That is, for proper operation in this specific example the converter may run cooler than 80° C. surface temperature (equivalent to 55° C. temperature increase at 25° C. room temperature).

As can be seen from FIGS. 38 and 39, the cascaded hybrid flyback or PCRC stage and the non-cascaded hybrid flyback stage generally have higher efficiency than all other topologies. The cascaded hybrid flyback PCRC stage has even higher efficiency than the non-cascaded hybrid flyback when operating with high-line voltage than with low-line voltage, as shown by points 797. Due to the higher efficiency, the surface temperature of the converter is lower for the cascaded hybrid flyback PCRC stage. Specifically the cascaded hybrid flyback will draw significant benefits from synchronous rectification of the bridge rectifier as discussed in the context of FIGS. 35 and 37.

Example embodiments of the present invention are summarized here. Other embodiments can also be understood from the entirety of the specification and the claims filed herein.

Example 1

A method of operating a converter including: charging an LC tank coupled between a switching network and a primary winding of a transformer for a first period of time by connecting the LC tank to one or more input capacitors via the switching network, where the switching network includes a first half-bridge coupled between a first supply terminal and a center node, and a second half-bridge coupled between the center node and a second supply terminal; preventing energy transfer from the primary winding of the transformer to a secondary winding of the transformer during the charging of the LC tank; and after charging the LC tank, discharging the LC tank for a second period of time by disconnecting a terminal of the LC tank from the one or more input capacitors.

Example 2

The method of example 1, where preventing energy transfer from the primary winding of the transformer to the secondary winding of the transformer during the charging the LC tank includes reverse biasing a diode in series with the secondary winding of the transformer.

Example 3

The method of one of examples 1 or 2, where connecting the LC tank to the one or more input capacitors includes turning on one or more transistors of the switching network with zero-voltage switching (ZVS) a third period of time after disconnecting the terminal of the LC tank from the one or more input capacitors.

Example 4

The method of one of examples 1 to 3, further including determining the third period of time based on a voltage of the one or more input capacitors.

Example 5

The method of one of examples 1 to 4, where discharging the LC tank includes turning on one or more transistors of the switching network with ZVS a fourth period of time after disconnecting a terminal of the LC tank from the one or more input capacitors.

Example 6

The method of one of examples 1 to 5, where the disconnecting the terminal of the LC tank from the one or more input capacitors transfers a first energy to the secondary winding of the transformer; the first period of time determines the first energy; and a resonance frequency of the LC tank determines the second period of time.

Example 7

The method of one of examples 1 to 6, further including controlling the first period of time based on a PWM signal.

Example 8

The method of one of examples 1 to 7, further including: when a voltage of an output terminal of the converter is higher than a predetermined value, transferring energy from the output terminal of the converter into a storage device; and when the voltage of the output terminal of the converter is lower than the predetermined value, transferring energy from the storage device into the output terminal.

Example 9

The method of one of examples 1 to 8, further including regulating a voltage of an output terminal of the converter by transferring energy between the output terminal and a storage device via a bidirectional converter.

Example 10

The method of one of examples 1 to 9, where the one or more input capacitors includes a first input capacitor and a second input capacitor, the method further including: receiving a rectified AC voltage via the one or more input capacitors; and when the rectified AC voltage is a rectified low-line voltage, charging the LC tank includes simultaneously transferring energy from the first input capacitor and the second input capacitor into the LC tank, and when the rectified AC voltage is a rectified high-line voltage, charging the LC tank includes transferring energy from the first input capacitor into the LC tank or transferring energy from the second input capacitor into the LC tank alternatively, without simultaneously transferring energy from the first input capacitor and second input capacitor into the LC tank.

Example 11

The method of one of examples 1 to 10, further including: when the rectified AC voltage is a rectified high-line voltage, charging the LC tank further includes transferring energy from the first input capacitor into the LC tank for a fifth period of time during a first switching cycle, and transferring energy from the second input capacitor into the LC tank for a sixth period of time during a second switching cycle after the first switching cycle.

Example 12

The method of one of examples 1 to 11, further including: monitoring a voltage of an intermediate node coupled between the first input capacitor and the second input capacitor; determining the fifth period of time based on the voltage of the intermediate node; and determining the sixth period of time based on the voltage of the intermediate node.

Example 13

The method of one of examples 1 to 12, further including generating the rectified AC voltage from an AC voltage with a bridge rectifier, where: when the rectified AC voltage is a rectified low-line voltage, the AC voltage is a low-line voltage including a root-mean-square (RMS) voltage between 85 V and 140 V; and when the rectified AC voltage is a rectified high-line voltage, the AC voltage is a high-line voltage including an RMS voltage between 200V and 270V.

Example 14

A converter including a controller configured to: charge an LC tank coupled between a switching network and a primary winding of a transformer for a first period of time by connecting the LC tank to one or more input capacitors by controlling transistors of the switching network, where the switching network includes a first half-bridge coupled between a first supply terminal and a center node, and a second half-bridge coupled between the center node and a second supply terminal; prevent energy transfer from the primary winding of the transformer to a secondary winding of the transformer during the charging the LC tank by controlling a first transistor in series with the secondary winding of the transformer; and after charging the LC tank, discharge the LC tank for a second period of time to transfer a first energy to the secondary winding of the transformer by disconnecting a terminal of the LC tank from the one or more input capacitors by turning off two transistors of the switching network.

Example 15

The converter of example 14, where preventing energy transfer from the primary winding of the transformer to the secondary winding of the transformer during the charging the LC tank includes turning off the first transistor.

Example 16

The converter of one of examples 14 or 15, where the controller is further configured to turn on the first transistor a fourth period of time after current begins flowing through a body diode of the first transistor.

Example 17

The converter of one of examples 14 to 16, where the controller is further configured to control the first period of time based on a PWM signal.

Example 18

The converter of one of examples 14 to 17, where the controller is further configured to: control transistors of a bidirectional converter stage coupled between an output terminal and a storage device to regulate a voltage at the output terminal, where the output terminal is coupled to the secondary winding of the transformer; and control transistors of the switching network to regulate a voltage at a terminal of the storage device.

Example 19

The converter of one of examples 14 to 18, where the controller is further configured to: control transistors of the bidirectional converter stage to buck-convert from the output terminal to the terminal of the storage device when the voltage at the output terminal is above a predetermined threshold; and control transistors of the bidirectional converter stage to boost from the terminal of the storage device to the output terminal when the voltage at the output terminal is below the predetermined threshold.

Example 20

The converter of one of examples 14 to 19, where transistors of the switching network switch at a lower frequency than transistors of the bidirectional converter stage.

Example 21

The converter of one of examples 14 to 20, further including: the LC tank; the switching network; the transformer; the bidirectional converter stage; and the first transistor.

Example 22

The converter of one of examples 14 to 21, where the one or more input capacitors are coupled between an AC power source producing an AC voltage and the switching network, the one or more input capacitors including a first input capacitor and a second input capacitor, the controller further configured to: when the AC voltage is a low-line voltage, control transistors of the switching network to simultaneously transfer energy from the first input capacitor and the second input capacitor into the LC tank; and when the AC voltage is a high-line voltage, control transistors of the switching network to transfer energy from the first input capacitor into the LC tank or the second input capacitor into the LC tank, without simultaneously transferring energy from the first input capacitor and second input capacitor into the LC tank.

Example 23

The converter of one of examples 14 to 22, where the controller is further configured to: monitor a rectified voltage generated by a bridge rectifier coupled between the AC power source and the one or more input capacitors; and determine whether the AC voltage is a high-line voltage or a low-line voltage based on the monitoring the rectified voltage.

Example 24

The converter of one of examples 14 to 24, where the controller is further configured to: when the AC voltage is a high-line AC signal, control transistors of the switching network to transfer energy from the first input capacitor into the LC tank for a fourth period of time during a first switching cycle, and control transistors of the switching network to transfer energy from the second input capacitor into the LC tank for a fifth period of time during a second switching cycle after the first switching cycle.

Example 25

The converter of one of examples 14 to 24, where the controller is further configured to: monitor a voltage of an intermediate node coupled between the first input capacitor and the second input capacitor; and determine the fourth period of time based on the voltage of the intermediate node.

Example 26

A circuit including: a first transistor coupled between a first supply terminal and a center node; a second transistor coupled between the center node and a second supply terminal; a first capacitor in series with a first inductive element coupled between the first transistor and a first winding of a transformer; a second inductive element coupled in parallel with the first winding of the transformer, the first winding of the transformer coupled to the second transistor; a first rectifying element coupled in series with a second winding of the transformer; and a bidirectional converter coupled to an output terminal, the output terminal coupled to the second winding of the transformer.

Example 27

The circuit of example 26, where the bidirectional converter includes: a third half-bridge coupled to the output terminal, and a third inductive element in series with a second capacitor coupled to the third half-bridge.

Example 28

The circuit of one of examples 26 or 27, further including: a full-bridge rectifier coupled between the first supply terminal and the second supply terminal, the full-bridge rectifier configured to receive an AC voltage.

Example 29

The circuit of one of examples 26 to 28, further including a load coupled between the first rectifying element and the second winding of the transformer.

Example 30

The circuit of one of examples 26 to 29, where the transformer includes the first inductive element and the second inductive element.

Example 31

The circuit of one of examples 26 to 30, where the first rectifying element includes a body diode of a third transistor.

Example 32

The circuit of one of examples 26 to 31, further including: a first half-bridge coupled between the first supply terminal and the center node, the first half-bridge including the first transistor; and a second half-bridge coupled between the center node and the second supply terminal, the second half-bridge including the second transistor.

Example 33

The circuit of one of examples 26 to 32, further including a controller, where the first half-bridge further includes a fourth transistor, the second half-bridge further includes a fifth transistor, and the controller is configured to: turn on the fourth and fifth transistor with zero-voltage switching (ZVS); after a first period of time from turning on the fourth and fifth transistor, turn off the fourth and fifth transistor; and after a second period of time after turning off the fourth and fifth transistor, turn on the first and second transistor with ZVS.

Example 34

The circuit of one of examples 26 to 33, where the second period of time is based on a voltage at the first supply terminal.

Example 35

The circuit of one of examples 26 to 32, further including a controller, where the first half-bridge further includes a fourth transistor, the second half-bridge includes a fifth transistor, and the controller is configured to: turn off the first transistor; after a first period of time from turning off the first transistor, turn on the fourth transistor with ZVS; after a second period of time from turning on the fourth transistor, turn off the fifth transistor; and after a third period of time from turning off the fifth transistor, turn on the second transistor with ZVS.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, converters 100, 400, and 500 may be implemented with or without synchronous rectifier circuits. Also, converters 100, 400, and 500 may be implemented with or without a compensation stage. Converters 100, 400, and 500 may be implemented with any of the PCRC stage implementations presented herein It is therefore intended that the appended claims encompass any such modifications or embodiments.

What is claimed is:

1. A method of operating a converter comprising:
charging an LC tank coupled between a switching network and a primary winding of a transformer for a first period of time by connecting the LC tank to one or more input capacitors via the switching network, wherein the switching network comprises a first half-bridge coupled between a first supply terminal and a center node, and a second half-bridge coupled between the center node and a second supply terminal, and wherein a portion of the first half-bridge and a portion of the second half-bridge are configured to provide a current recirculation mode with the LC tank;
preventing energy transfer from the primary winding of the transformer to a secondary winding of the transformer during the charging of the LC tank; and
after charging the LC tank, discharging the LC tank for a second period of time by disconnecting a terminal of the LC tank from the one or more input capacitors.

2. The method of claim 1, wherein preventing energy transfer from the primary winding of the transformer to the secondary winding of the transformer during the charging the LC tank comprises reverse biasing a diode in series with the secondary winding of the transformer.

3. The method of claim 1, wherein connecting the LC tank to the one or more input capacitors comprises turning on one or more transistors of the switching network with zero-voltage switching (ZVS) for a third period of time after disconnecting the terminal of the LC tank from the one or more input capacitors.

4. The method of claim 3, further comprising determining the third period of time based on a voltage of the one or more input capacitors.

5. The method of claim 1, wherein discharging the LC tank comprises turning on one or more transistors of the switching network with ZVS for a fourth period of time after disconnecting the terminal of the LC tank from the one or more input capacitors.

6. The method of claim 1, wherein
the disconnecting the terminal of the LC tank from the one or more input capacitors transfers a first energy to the secondary winding of the transformer;
the first period of time determines the first energy; and
a resonance frequency of the LC tank determines the second period of time.

7. The method of claim 6, further comprising controlling the first period of time based on a PWM signal.

8. The method of claim 1, further comprising:
when a voltage of an output terminal of the converter is higher than a predetermined value, transferring energy from the output terminal of the converter into a storage device; and
when the voltage of the output terminal of the converter is lower than the predetermined value, transferring energy from the storage device into the output terminal.

9. The method of claim 1, further comprising regulating a voltage of an output terminal of the converter by transferring energy between the output terminal and a storage device via a bidirectional converter.

10. The method of claim 1, wherein the one or more input capacitors comprises a first input capacitor and a second input capacitor, the method further comprising:
receiving a rectified AC voltage via the one or more input capacitors; and
when the rectified AC voltage is a rectified low-line voltage, charging the LC tank comprises simultaneously transferring energy from the first input capacitor and the second input capacitor into the LC tank, and
when the rectified AC voltage is a rectified high-line voltage, charging the LC tank comprises transferring energy from the first input capacitor into the LC tank or transferring energy from the second input capacitor into the LC tank alternatively, without simultaneously transferring energy from the first input capacitor and second input capacitor into the LC tank.

11. The method of claim 10, further comprising:
when the rectified AC voltage is the rectified high-line voltage, charging the LC tank further comprises
transferring energy from the first input capacitor into the LC tank for a fifth period of time during a first switching cycle, and transferring energy from the second input capacitor into the LC tank for a sixth period of time during a second switching cycle after the first switching cycle.

12. The method of claim 11, further comprising:
monitoring a voltage of an intermediate node coupled between the first input capacitor and the second input capacitor;
determining the fifth period of time based on the voltage of the intermediate node; and
determining the sixth period of time based on the voltage of the intermediate node.

13. The method of claim 10, further comprising generating the rectified AC voltage from an AC voltage with a bridge rectifier, wherein:
when the rectified AC voltage is the rectified low-line voltage, the AC voltage is a low-line voltage comprising a root-mean-square (RMS) voltage between 85 V and 140 V; and
when the rectified AC voltage is the rectified high-line voltage, the AC voltage is a high-line voltage comprising an RMS voltage between 200V and 270V.

14. A converter comprising a controller configured to:
charge an LC tank coupled between a switching network and a primary winding of a transformer for a first period of time by connecting the LC tank to one or more input capacitors by controlling transistors of the switching network, wherein the switching network comprises a first half-bridge coupled between a first supply terminal and a center node, and a second half-bridge coupled between the center node and a second supply terminal, and wherein a portion of the first half-bridge and a portion of the second half-bridge are configured to provide a current recirculation mode with the LC tank;
prevent energy transfer from the primary winding of the transformer to a secondary winding of the transformer during the charging the LC tank by controlling a first transistor in series with the secondary winding of the transformer; and
after charging the LC tank, discharge the LC tank for a second period of time to transfer a first energy to the secondary winding of the transformer by
disconnecting a terminal of the LC tank from the one or more input capacitors by turning off two transistors of the switching network.

15. The converter of claim 14, wherein preventing energy transfer from the primary winding of the transformer to the secondary winding of the transformer during the charging the LC tank comprises turning off the first transistor.

16. The converter of claim 15, wherein the controller is further configured to turn on the first transistor a fourth period of time after current begins flowing through a body diode of the first transistor.

17. The converter of claim 14, wherein the controller is further configured to control the first period of time based on a PWM signal.

18. The converter of claim 17, wherein the controller is further configured to:
control transistors of a bidirectional converter stage coupled between an output terminal and a storage device to regulate a voltage at the output terminal, wherein the output terminal is coupled to the secondary winding of the transformer; and
control transistors of the switching network to regulate a voltage at a terminal of the storage device.

19. The converter of claim 18, wherein the controller is further configured to:
control transistors of the bidirectional converter stage to buck-convert from the output terminal to the terminal of the storage device when the voltage at the output terminal is above a predetermined threshold; and
control transistors of the bidirectional converter stage to boost from the terminal of the storage device to the output terminal when the voltage at the output terminal is below the predetermined threshold.

20. The converter of claim 18, wherein transistors of the switching network switch at a lower frequency than transistors of the bidirectional converter stage.

21. The converter of claim 18, further comprising:
the LC tank;
the switching network;
the transformer;
the bidirectional converter stage; and
the first transistor.

22. The converter of claim 14, wherein the one or more input capacitors are coupled between an AC power source producing an AC voltage and the switching network, the one or more input capacitors comprising a first input capacitor and a second input capacitor, the controller further configured to:
when the AC voltage is a low-line voltage, control transistors of the switching network to simultaneously transfer energy from the first input capacitor and the second input capacitor into the LC tank; and
when the AC voltage is a high-line voltage, control transistors of the switching network to transfer energy from the first input capacitor into the LC tank or the second input capacitor into the LC tank, without simultaneously transferring energy from the first input capacitor and second input capacitor into the LC tank.

23. The converter of claim 22, wherein the controller is further configured to:
monitor a rectified voltage generated by a bridge rectifier coupled between the AC power source and the one or more input capacitors; and
determine whether the AC voltage is the high-line voltage or the low-line voltage based on the monitoring the rectified voltage.

24. The converter of claim 22, wherein the controller is further configured to:
when the AC voltage is the high-line voltage,
control transistors of the switching network to transfer energy from the first input capacitor into the LC tank for a fourth period of time during a first switching cycle, and
control transistors of the switching network to transfer energy from the second input capacitor into the LC tank for a fifth period of time during a second switching cycle after the first switching cycle.

25. The converter of claim 24, wherein the controller is further configured to:
monitor a voltage of an intermediate node coupled between the first input capacitor and the second input capacitor; and
determine the fourth period of time based on the voltage of the intermediate node.

* * * * *